United States Patent
Xu et al.

(10) Patent No.: US 9,913,202 B2
(45) Date of Patent: Mar. 6, 2018

(54) DEVICE AND METHOD FOR PROXIMITY BASED SMALL CELL DISCOVERY

(71) Applicant: Sony Corporation, Tokyo (JP)

(72) Inventors: Xiaodong Xu, Beijing (CN); Yateng Hong, Beijing (CN); Ya Liu, Beijing (CN); Chengjin Luo, Beijing (CN)

(73) Assignee: SONY CORPORATION, Tokyo (JP)

( * ) Notice: Subject to any disclaimer, the term of this patent is extended or adjusted under 35 U.S.C. 154(b) by 17 days.

(21) Appl. No.: 14/760,648

(22) PCT Filed: Dec. 26, 2013

(86) PCT No.: PCT/CN2013/090514
§ 371 (c)(1),
(2) Date: Jul. 13, 2015

(87) PCT Pub. No.: WO2014/114164
PCT Pub. Date: Jul. 31, 2014

(65) Prior Publication Data
US 2015/0358890 A1    Dec. 10, 2015

(30) Foreign Application Priority Data
Jan. 25, 2013   (CN) .......................... 2013 1 0030313

(51) Int. Cl.
*H04W 48/04*    (2009.01)
*H04W 36/00*    (2009.01)
(Continued)

(52) U.S. Cl.
CPC ............. *H04W 48/04* (2013.01); *H04W 8/02* (2013.01); *H04W 36/0094* (2013.01);
(Continued)

(58) Field of Classification Search
CPC .................................................... H04W 48/04
See application file for complete search history.

(56) References Cited

U.S. PATENT DOCUMENTS

| 2012/0295642 A1 | 11/2012 | Takahashi et al. | |
|---|---|---|---|
| 2013/0150054 A1* | 6/2013 | Axmon | H04W 36/32 455/440 |
| 2014/0066074 A1* | 3/2014 | Folke | H04W 36/08 455/437 |

FOREIGN PATENT DOCUMENTS

| CN | 101110627 | 1/2008 |
|---|---|---|
| CN | 102763437 | 10/2012 |

(Continued)

OTHER PUBLICATIONS

International Search Report Issued Apr. 3, 2014 in PCT/CN2013/090514 filed Dec. 26, 2013.

(Continued)

*Primary Examiner* — Vladimir Magloire
*Assistant Examiner* — David Orange
(74) *Attorney, Agent, or Firm* — Oblon, McClelland, Maier & Neustadt, L.L.P.

(57) ABSTRACT

A device in a wireless communication system that includes circuitry that acquires location information of user equipment, calculates, according to at least the location information, stay time required for the user equipment to pass through the small cell, the stay time being a limited time, evaluates a mobility state of the user equipment according to the location information of the user equipment at different time by comparing the calculated stay time with a predetermined stay time threshold value, determines an operation from among a plurality of operations related to small cell detection according to changes in the mobility state and the location information of the user equipment, and execute the determined operation related to small cell detection.

16 Claims, 12 Drawing Sheets

(51) Int. Cl.
*H04W 64/00* (2009.01)
*H04W 8/02* (2009.01)
*H04W 48/16* (2009.01)

(52) U.S. Cl.
CPC .......... *H04W 48/16* (2013.01); *H04W 64/00* (2013.01); *H04W 64/003* (2013.01); *H04W 36/0088* (2013.01)

(56) References Cited

FOREIGN PATENT DOCUMENTS

| CN | 102869053 | 1/2013 |
| CN | 103179609 | 6/2013 |

OTHER PUBLICATIONS

"Enhancements for Small Cell Detection", Nokia Siemens Networks, Nokia Corporation, 3GPP TSG-RAN WG2 Meeting #77, R2-120523, Feb. 6-10, 2012.

* cited by examiner

DEVICE AND METHOD FOR PROXIMITY BASED SMALL CELL DISCOVERY

FIELD OF THE INVENTION

The present invention generally relates to the field of wireless communication, and more particularly, to a device and method in Long Term Evolution (LTE) and LTE-advanced (LTE-A) of Universal Mobile Telecommunication System (UMTS).

BACKGROUND OF THE INVENTION

A concept of heterogeneous network was first proposed in 3GPP Rel-10 and quickly becomes a hot point of focus in the art. Mobility enhancement under the heterogeneous network is one of work items in this filed, which is intended to improve network capacity while providing seamless and stable coverage for users.

Many problems have been discussed in the mobility enhancement under the heterogeneous network, and small cell detection is one of hot points of discussion focuses in the work item of heterogeneous network mobility enhancement of 3GPP. The heterogeneous network includes a large number of small cells, e.g., a micro base station, a pico base station, a femto base station, a radio remote unit and the like, which are mainly distributed in places such as home, office, shopping center and the like. Load on a macro base station is reduced and capacity of the network is also improved by switching user equipment to small cells.

However, the introduction of the concept of heterogeneous network has also brought about many problems. For example, the current mechanism for detecting adjacent cells is to ensure mobility of user equipment (UE), without considering new disposition environment in the heterogeneous network. Further, for example, in the existing standard, the mechanism for detecting adjacent cells is based on s-Measure and measurement for Reference Signal Reception Power (RSRP) and/or Reference Signal Reception Quality (RSRQ). Because of non-uniformity of distribution of the cells in the heterogeneous network, a macro cell has a good service quality but may be very close to the small cells, and the user equipment might not be able to detect the small cells within the macro cell. Also, for example, the small cell detection strategy always needs use of measurement gaps, and for the user equipment, frequent configuration of the measurement gaps not only consumes power, but also greatly occupies available resources.

It has been noted that in the disposition of the heterogeneous network, a scene of coverage by hotspot areas is very common. In this scene, the macro cell mainly provides coverage of large areas, and the small cells, e.g., the pico cells, provide service bearer on another frequency. Therefore, it is possible to improve an index of quality of service (QoS) for users in the hotspot areas, and it is also possible to improve throughput of the whole network. However, due to the inter-frequency disposition of the small cells and non-uniformity of the coverage range, it needs to design a corresponding mechanism to ensure the user equipment can effectively switch to the small cells. In 3GPP TR 36.839, inter-frequency small cell detection includes several common types:

a) Relaxed Measurement Configuration

According to types (serving as hotspots or providing coverage) of the small cells and a speed of the user equipment, a measurement cycle is increased to reduce unnecessary measurements and the user equipment moving at a high speed is not allowed to get access to the small cells within the hotspot. This scheme reduces power consumption on the user equipment side and interference on user plane of a serving cell, but has a poor accuracy and delay in detection.

b) Proximity Based Small Cell Indication

Inter-frequency cell measurement may be triggered based on Proximity Indication, and these schemes can be classified as being based on macro base station, based on small cells or based on user equipment. The schemes based on macro base station and based on small cells made no changes on the user plane, and the biggest problem is how to improve accuracy. Further, the scheme based on small cells needs to modify X2 interface. However, the scheme based on user equipment has higher accuracy and higher feasibility, but may increase complexity on the user equipment side.

c) Small Cell Discovery Signal in Macro Layer

The base station of the small cell transmits a cell discovery signal (constituted by Primary Synchronization Signal (PSS), Secondary Synchronization Signal (SSS) and system information) on an operating frequency band of the macro cell. Thus, the user equipment may consider the small cell as a common intra-frequency cell and perform normal procedures such as measurement reporting and the like. Then, the base station may immediately trigger handover of the user equipment, or may make the user equipment perform inter-frequency cell measurement. This scheme is relatively simple, but there exists a problem that interference is caused between the small cell discovery signal and a macro cell signal and that execution of the handover might incur a certain delay. Further, forward compatibility can not be ensured, and thus traditional users can not accept and execute related signaling.

Therefore, it is intended to provide a device and method in a wireless communication system so as to improve efficiency for small cell discovery, thereby providing seamless and stable network coverage for the user.

SUMMARY OF THE INVENTION

According to an embodiment of the invention, there is provided a device in a wireless communication system, the device including: a location information acquiring unit for acquiring location information of user equipment; a mobility state evaluating unit for evaluating a mobility state of the user equipment according to the location information of the user equipment at different time; and an executing unit for executing corresponding operations related to small cell detection according to changes in the mobility state and the location information of the user equipment.

According to the device, the location information acquiring unit performs positioning on the user equipment according to round trip time and an angle of arrival which are obtained by performing measurement on the user equipment, so as to acquire the location information of the user equipment, wherein the round trip time is obtained by performing measurement on the user equipment using timing advance information of the user equipment by the location information acquiring unit.

According to the device, the location information acquiring unit performs measurement on the user equipment for a plurality of times, at a predetermined sampling cycle, within a predetermined sampling time window, so as to obtain a plurality of the round trip time and a plurality of the angles of arrival.

According to the device, the location information acquiring unit calculates an error correction factor using a result of Global Navigation Satellite System assisted measurement as a reference value, and corrects the positioning using the error correction factor.

According to the device, the operations related to the small cell detection which are executed by the executing unit include one or more of the following operations: judging, according to a distance between the user equipment and a small cell, whether the user equipment is approaching the small cell, or judging whether the user equipment satisfies an initial condition of the small cell detection.

According to the device, the mobility state evaluating unit is further adapted to calculate a movement speed and/or a movement direction of the user equipment according to a plurality of location information of the user equipment at different time.

According to the device, the plurality of location information of the user equipment at different time is obtained at a predetermined acquirement cycle, and the executing unit is further adapted to update the acquirement cycle of the user equipment according to a current movement speed of the user equipment.

According to the device, the mobility state evaluating unit is further adapted to classify the movement speed of the user equipment into different speed levels, and the executing unit is further adapted to classify, using region dividing criteria corresponding to the speed levels of the user equipment, the position where the user equipment is located into different regions.

According to the device, the mobility state evaluating unit is further adapted to determine a boundary range corresponding to the small cell according to a magnitude of the movement speed of the user equipment, and the executing unit is further adapted to judge, by comparing the distance between the user equipment and the small cell with the boundary range, whether the user equipment is approaching the small cell.

According to the device, the mobility state evaluating unit is further adapted to classify the small cells adjacent to each other into the same cluster, and to calculate a union of boundary ranges corresponding to the respective small cells in the same cluster as a boundary range corresponding to the same cluster.

According to the device, the plurality of location information of the user equipment at different time is obtained at a predetermined acquirement cycle, and the executing unit is further adapted to set a longer acquirement cycle if the user equipment is located outside the boundary range, and to set a shorter acquirement cycle if the user equipment is located within the boundary range.

According to the device, the executing unit is further adapted to judge whether the user equipment satisfies an initial condition of the small cell detection, in the case that the user equipment is located within the boundary range, the initial condition being one or more of: the user equipment is in a non-high-speed mobility state; and the small cell is in a good load condition and has remaining resources for access of the user equipment.

According to the device, the mobility state evaluating unit is further adapted to calculate, according to the location information, the movement speed and the movement direction of the user equipment, stay time required for the user equipment to pass through the small cell, and to compare the calculated stay time with a predetermined stay time threshold value to evaluate whether the user equipment is in the non-high-speed mobility state.

According to the device, it further includes an inter-frequency adjacent cell measurement judging unit for judging whether to trigger inter-frequency adjacent cell measurement of the user equipment.

According to the device, the mobility state evaluating unit is further adapted to calculate, according to the location information, the movement speed and the movement direction of the user equipment, reaction time for arrival of the user equipment at a coverage range of the small cell, and the inter-frequency adjacent cell measurement judging unit is further adapted to compare the calculated reaction time with a predetermined reaction time threshold value to judge whether to trigger inter-frequency adjacent cell measurement of the user equipment.

According to the device, the mobility state evaluating unit is further adapted to divide the boundary range into a plurality of sub-regions, each sub-region corresponding to a predetermined triggering probability, and is further adapted to judge, according to the location information of the user equipment, a sub-region where the user equipment is located and its corresponding triggering probability; and the inter-frequency adjacent cell measurement judging unit is further adapted to trigger inter-frequency adjacent cell measurement of the user equipment according to the determined triggering probability corresponding to the sub-region where the user equipment is located.

According to the device, it further includes an inter-frequency adjacent cell access judging unit for judging, according to a measurement report of the user equipment and the location information of the user equipment, whether to trigger inter-frequency cell handover and/or carrier loading of the user equipment, in the case that inter-frequency adjacent cell measurement of the user equipment has been triggered.

According to another embodiment of the invention, there is provided a method for use in a wireless communication system, the method including: a location information acquiring step of acquiring location information of user equipment; a mobility state evaluating step of evaluating a mobility state of the user equipment according to the location information of the user equipment at different time; and an executing step of executing corresponding operations related to small cell detection according to changes in the mobility state and the location information of the user equipment.

According to the method, in the location information acquiring step, positioning is performed on the user equipment according to round trip time and an angle of arrival which are obtained by performing measurement on the user equipment, so as to acquire the location information of the user equipment, wherein the round trip time is obtained by performing measurement on the user equipment using timing advance information of the user equipment.

According to the method, in the location information acquiring step, measurement is performed on the user equipment for a plurality of times, at a predetermined sampling cycle, within a predetermined sampling time window, so as to obtain a plurality of the round trip time and a plurality of the angles of arrival.

According to the method, in the location information acquiring step, an error correction factor is calculated using a result of Global Navigation Satellite System assisted measurement as a reference value, and the positioning is corrected using the error correction factor.

According to the method, the operations related to the small cell detection which are executed in the executing step include one or more of: judging, according to a distance between the user equipment and a small cell, whether the user equipment is approaching the small cell, or judging whether the user equipment satisfies an initial condition of the small cell detection.

According to the method, in the mobility state evaluating step, a movement speed and/or a movement direction of the user equipment is further calculated according to a plurality of location information of the user equipment at different time.

According to the method, the plurality of location information of the user equipment at different time is obtained at a predetermined acquirement cycle, and in the executing step, the acquirement cycle of the user equipment is further updated according to a current movement speed of the user equipment.

According to the method, in the mobility state evaluating step, the movement speed of the user equipment is further classified into different speed levels, and in the executing step, the position where the user equipment is located is further classified into different regions using region dividing criteria corresponding to the speed levels of the user equipment.

According to the method, in the mobility state evaluating step, a boundary range corresponding to the small cell is further determined according to a magnitude of the movement speed of the user equipment, and in the executing step, it is further judged, by comparing the distance between the user equipment and the small cell with the boundary range, whether the user equipment is approaching the small cell.

According to the method, in the mobility state evaluating step, the small cells adjacent to each other are further classified into the same cluster, and a union of boundary ranges corresponding to the respective small cells in the same cluster is calculated as a boundary range corresponding to the same cluster.

According to the method, the plurality of location information of the user equipment at different time is obtained at a predetermined acquirement cycle, and in the executing step: a longer acquirement cycle is set if the user equipment is located outside the boundary range; and a shorter acquirement cycle is set if the user equipment is located within the boundary range.

According to the method, in the executing step, it is further judged whether the user equipment satisfies an initial condition of the small cell detection, in the case that the user equipment is located within the boundary range, the initial condition being one or more of: the user equipment is in a non-high-speed mobility state; and the small cell is in a good load condition and has remaining resources for access of the user equipment.

According to the method, in the mobility state evaluating step, stay time required for the user equipment to pass through the small cell is further calculated according to the location information, the movement speed and the movement direction of the user equipment, and the calculated stay time is compared with a predetermined stay time threshold value to evaluate whether the user equipment is in the non-high-speed mobility state.

According to the method, it further includes an inter-frequency adjacent cell measurement judging step of judging whether to trigger inter-frequency adjacent cell measurement of the user equipment.

According to the method, in the mobility state evaluating step, reaction time for arrival of the user equipment at a coverage range of the small cell is further calculated according to the location information, the movement speed and the movement direction of the user equipment, and in the inter-frequency adjacent cell measurement judging step, the calculated reaction time is further compared with a predetermined reaction time threshold value to judge whether to trigger inter-frequency adjacent cell measurement of the user equipment.

According to the method, in the mobility state evaluating step, the boundary range is further divided into a plurality of sub-regions, each sub-region corresponding to a predetermined triggering probability, and a sub-region where the user equipment is located and its corresponding triggering probability are further judged according to the location information of the user equipment; and in the inter-frequency adjacent cell measurement judging step, inter-frequency adjacent cell measurement of the user equipment is further triggered according to the determined triggering probability corresponding to the sub-region where the user equipment is located.

According to the method, it further includes an inter-frequency adjacent cell access judging step of judging, according to a measurement report of the user equipment and the location information of the user equipment, whether to trigger inter-frequency cell handover and/or carrier loading of the user equipment, in the case that inter-frequency adjacent cell measurement of the user equipment has been triggered.

According to another embodiment of the invention, there is provided a device in a wireless communication system, the device including: an angle of arrival measuring unit for measuring an angle of arrival of a signal sent from user equipment to a base station; a round trip time measuring unit for measuring round trip time as required for one round trip of the signal between the user equipment and the base station; and a positioning unit for positioning the user equipment according to the angle of arrival and the round trip time, in which the round trip time measuring unit obtains the round trip time by performing measurement on the user equipment using timing advance of the user equipment.

According to the device, it further includes a receiving unit for receiving positioning information of Global Navigation Satellite System reported by the user equipment; and a correcting unit for calculating an error correction factor using the positioning information of the Global Navigation Satellite System as a reference value and correcting the positioning using the error correction factor.

According to another embodiment of the invention, there is provided a method for use in a wireless communication system, the method including: an angle of arrival measuring step of measuring an angle of arrival of a signal sent from user equipment to a base station; a round trip time measuring step of measuring round trip time as required for one round trip of the signal between the user equipment and the base station; and a positioning step of positioning the user equipment according to the angle of arrival and the round trip time, in which in the round trip time measuring step, the round trip time is obtained by performing measurement on the user equipment using timing advance of the user equipment.

According to the method, it further includes a receiving step of receiving positioning information of Global Navigation Satellite System reported by the user equipment; and a correcting step of calculating an error correction factor using the positioning information of the Global Navigation Satellite System as a reference value and correcting the positioning using the error correction factor.

According to another embodiment of the invention, there is provided a computer storage medium containing computer readable instructions which are used for causing a computer to perform: a location information acquiring step of acquiring location information of user equipment; a mobility state evaluating step of evaluating a mobility state of the user equipment according to the location information of the user equipment at different time; and an executing step of executing corresponding operations related to small cell detection according to changes in the mobility state and the location information of the user equipment.

According to another embodiment of the invention, there is provided a computer storage medium containing computer readable instructions which are used for causing a computer to perform: an angle of arrival measuring step of measuring an angle of arrival of a signal sent from user equipment to a base station; a round trip time measuring step of measuring round trip time as required for one round trip of the signal between the user equipment and the base station; and a positioning step of positioning the user equipment according to the angle of arrival and the round trip time, in which in the round trip time measuring step, the round trip time is obtained by performing measurement on the user equipment using timing advance of the user equipment.

With this invention, it is possible to perform corresponding operations related to small cell detection according to changes in the mobility state and the location information of the user equipment, thereby improving efficiency in the small cell detection, and further providing seamless and stable network coverage for the user.

BRIEF DESCRIPTION OF THE DRAWINGS

The foregoing and other objects, features and advantages of the invention can be more easily understood with reference to the description of embodiments given below in conjunction with the accompanying drawings, throughout which identical or corresponding reference signs denote identical or corresponding technical features or components.

DETAILED DESCRIPTION OF THE INVENTION

Figure 1:
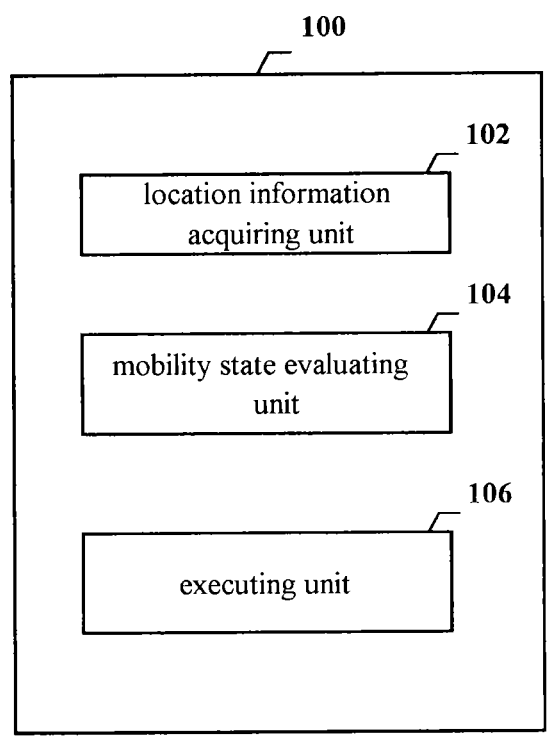
FIG. 1 is a block diagram illustrating configuration of a device in a wireless communication system according to an embodiment of the invention.

Embodiments of the present invention will be described below with reference to the accompanying drawings. It is to be noted that for the sake of clarity, representations and descriptions of components and processing which are known to those ordinarily skilled in the art and unrelated with the invention are omitted in the drawings and description.

The configuration of a device in a wireless communication system according to an embodiment of the invention is described in conjunction with FIG. 1 below. FIG. 1 is a block diagram illustrating configuration of a device in a wireless communication system according to an embodiment of the invention.

As shown in FIG. 1, the device 100 in the wireless communication system may include a location information acquiring unit 102, a mobility state evaluating unit 104 and an executing unit 106.

The location information acquiring unit 102 may acquire location information of user equipment.

The location information of the user equipment is one of important information provided to network side. According to the location information of the user equipment, the network side can execute the procedure of small cell detection more accurately.

Specifically, the location information acquiring unit 102 may acquire the location information of the user equipment in multiple manners. For example, the location information acquiring unit 102 may acquire the location information of the user equipment by positioning the user equipment. Further, for example, the location information acquiring unit 102 may acquire the location information of the user equipment by receiving a measurement result of Global Navigation Satellite System (GNSS) reported by the user equipment, and the GNSS may be for example Global Positioning System (GPS).

According to one embodiment of the invention, the location information acquiring unit 102 may position the user equipment according to round trip time and an angle of arrival obtained by performing measurement on the user equipment, so as to acquire the location information of the user equipment. Particularly, the round trip time is obtained by performing measurement on the user equipment by the location information acquiring unit 102 using timing advance information of the user equipment.

In 3GPP 36.305, a plurality of methods for positioning the user equipment are defined, for example, network side Assisted GNSS (A-GNSS), downlink positioning, Enhanced Cell-ID (E-CID) positioning, uplink positioning or the like. The various methods for positioning the user equipment described above may have different implementation manners which are specifically shown in Table 1.

TABLE 1 different methods for positioning the user equipment

| | UE-based | UE assisted, E-SMLC-based | eNodeB assisted | LMU assisted, E-SMLC-based | SUPL |
|---|---|---|---|---|---|
| A-GNSS | ✓ | ✓ | x | x | ✓ |
| Downlink positioning | x | ✓ | x | x | ✓ |
| E-CID | x | ✓ | ✓ | x | ✓ |
| Uplink positioning | x | x | ✓ | ✓ | x |

E-CID uses geographical knowledge of a serving cell for the user equipment. Further, in order to improve accuracy, measurement performed by the user equipment and/or eNodeB may be additionally adopted. As specific implementing manners of E-CID, for example, the user equipment may be positioned according to the round trip time (RTT) and the angle of arrival (AoA) obtained by performing measurement on the user equipment.

In order to ensure simplicity and effectiveness of the scheme as a whole, the invention positions the user equipment using the implementing manner of measuring the round trip time and the angle of arrival in E-CID. Specifically, the round trip time and the angle of arrival are measured on the base station side. A distance between the user equipment and the base station can be determined by measuring the round trip time. Further, a direction between the user equipment and the base station can be determined by measuring the angle of arrival. According to the determined distance and direction between the user equipment and the base station, a relative position between the user equipment and the base station can be obtained. Since the measuring of the round trip time and the angle of arrival is performed on the base station side, the flow for positioning the user equipment can be simplified, and compatibility with the existing standard can be realized, without adding extra load on the user equipment.

The angle of arrival can be measured in various ways. For example, an array of antenna on the base station side may track an uplink signal sent by the user equipment and measure the angle of arrival of the uplink signal, thereby determining the direction between the user equipment and the base station. As an example, the uplink signal sent by the user equipment may be a SRS signal, a DM-RS signal or the like.

Further, the round trip time can be measured in various ways. For example, the round trip time can be determined according to measurement of time at which the user equipment or the base station sends/receives an n-th subframe. In 3GPP 36.305, two manners for measuring the round trip time are defined, i.e., Type 1 and Type 2. Type 1 and Type 2 for measuring the round trip time are compared in the following table 2.

TABLE 2 comparison between Type 1 and Type 2 for measuring the round trip time

| | Type 1 | Type 2 |
|---|---|---|
| definition | (receiving time of base station − sending time of base station) + (receiving time of user equipment − sending time of user equipment) | receiving time of base station − sending time of base station (PRACH channel) |
| Time delay/accuracy | 0.3 μs/45 m | 1-2 μs |
| application | User equipment of version 9 and following versions | User equipment of version 8 and following versions |
| notes | More accurate, but requiring assistance of the user equipment | Simpler, but lower accuracy |

In Type 2 for measuring the round trip time, the base station acquires the round trip time by triggering a dedicated random access procedure to measure arrival time of a preamble signal sent by the user equipment. In LTE system, the time at which the user equipment sends the preamble signal is based on time at which the user equipment receives the downlink signal, without sending in advance. Therefore, the time at which the preamble signal sent by the user equipment arrives at the base station is two times of one-way transmission time delay. As can be seen from above, the implementation scheme of Type 2 for measuring the round trip time is simpler where the base station can independently achieve measurement and positioning for the user equipment, but a PRACH channel needs to be used.

Figure 2:
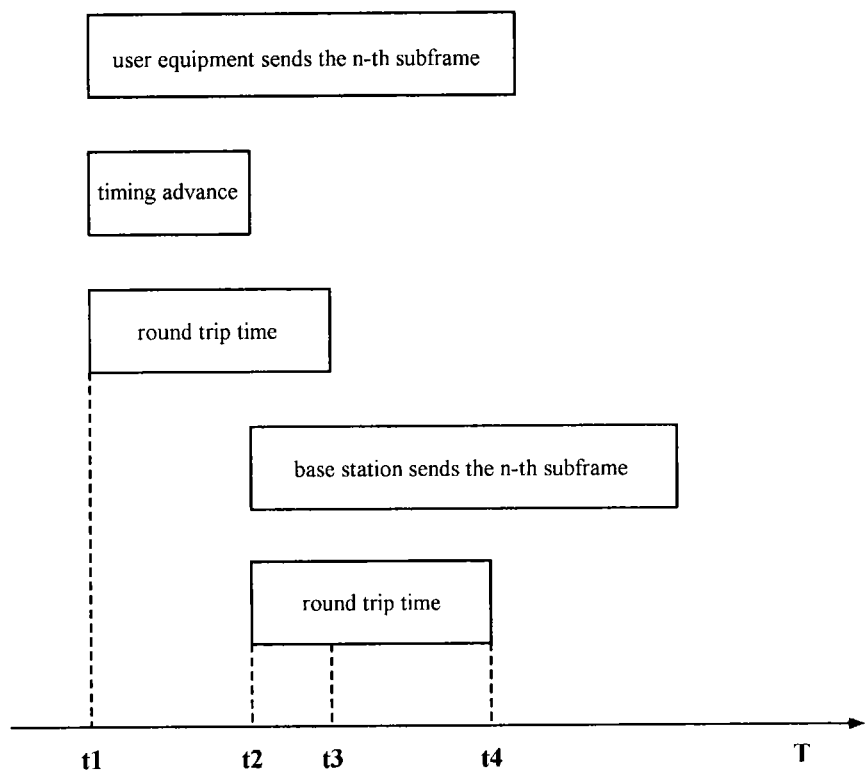
FIG. 2 is a schematic diagram illustrating Type 1 for measuring round trip time and a manner for measuring round trip time according to an embodiment of the invention.

Type 1 for measuring the round trip time and a manner for measuring the round trip time according to an embodiment of the invention will be described below in conjunction with FIG. 2. FIG. 2 is a schematic diagram illustrating Type 1 for measuring the round trip time and a manner for measuring the round trip time according to an embodiment of the invention.

As shown in FIG. 2, an abscissa axis indicates time T. Time $t1$ indicates time at which the user equipment sends an n-th subframe, time $t2$ indicates time at which the base station sends an n-th subframe, time $t3$ indicates time at which the base station receives the n-th subframe, and time $t4$ indicates time at which the user equipment receives the n-th subframe. Further, as shown in FIG. 2, the timing advance TA indicates time by which the time $t1$ at which the user equipment sends the n-th subframe is in advance of the time $t2$ at which the base station sends the n-th subframe, that is, $TA=t2-t1$.

According to Type 1 for measuring the round trip time, the round trip time RTT equals to a time difference $(t3-t2)$ between the time $t3$ at which the base station receives the n-th subframe and the time $t2$ at which the base station sends the n-th subframe, or a time difference $(t4-t1)$ between the time $t4$ at which the user equipment receives the n-th subframe and the time $t1$ at which the user equipment sends the n-th subframe, that is, $RTT=((t3-t2)+(t4-t1))/2$. For more details regarding Type 1 for measuring the round trip time, section 8.3.1 in 3GPP 36.305 and section "19.4.2" in "LTE—The UMTS Long Term Evolution: From Theory to Practice (Second Edition)" may be referred to.

With the manner for measuring the round trip time according to the embodiment of the invention, the round trip time RTT equals to the time difference between the time $t3$ at which the base station receives the n-th subframe and the time $t1$ at which the user equipment sends the n-th subframe, that is, $RTT=t3-t1$. As described above, the timing advance $TA=t2-t1$, then $t1=t2-TA$. Substituting $t1=t2-TA$ into $RTT=t3-t1$, it can be obtained that $RTT=t3-(t2-TA)=t3-t2+TA$. As can be seen from above, the round trip time RTT obtained with the manner for measuring the round trip time according to the embodiment of the invention equals to the time difference (t3−t2) between the time t3 at which the base station receives the n-th subframe and the time t2 at which the base station sends the n-th subframe plus the timing advance TA. Therefore, with the manner for measuring the round trip time according to the embodiment of the invention, the base station may utilize information about the timing advance TA of the user equipment to complete the measurement of the round trip time independently, without assistance by the user equipment. Further, as compared with the Type 2 for measuring the round trip time, the manner for measuring the round trip time according to the embodiment of the invention is not limited to the preamble signal used in the PRACH channel, and thus has a wider range of application.

After measuring the round trip time RTT, the distance L between the base station and the user equipment can be represented as L=c×RTT/2, in which c is a broadcast speed of radio wave in air.

According to an embodiment of the invention, the location information acquiring unit 102 may perform measurement on the user equipment for a plurality of times, at a predetermined sampling cycle, within a predetermined sampling time window, so as to obtain a plurality of round trip time and a plurality of angles of arrival.

When measuring the angle of arrival and the round trip time in actual communication environment, there always exists error in the measured angle of arrival and round trip time due to the influence of multipath effect. In order to reduce the measurement error due to the multipath effect, a time period may be set as the sampling time window in advance. Measurement may be performed on the user equipment for multiple times at the predetermined sampling cycle within the sampling time window, so as to obtain multiple round trip time and multiple angles of arrival.

For example, at time t, the base station needs to acquire the location information of the user equipment. Then, the base station configures a sampling time window with a duration of $\Delta T$ at the time t. Within the sampling time window from the time t to time $t+\Delta T$, the base station performs measurement on the user equipment for many times at a sampling cycle of Ts to obtain multiple round trip time and multiple angles of arrival. When $\Delta T$ is small enough, the movement distance of the user equipment within this sampling time window is not large. Therefore, among the multiple round trip time and multiple angles of arrival measured in the sampling time window, a signal with least time for arrival subjects to less number of times of reflection, and it is much likely a direct path or approximates the direct path. Therefore, as an example, the position of the user equipment at the time t may be determined in the following manner: bad value points are removed from the measured multiple round trip time and multiple angles of arrival to obtain n round trip time $\{RTT_1, RTT_2, \ldots RTT_n\}$ and n angles of arrival $\{\theta_1, \theta_2, \ldots, \theta_n\}$ with the bad value points being removed; a minimum value of the n round trip time $\{RTT_1, RTT_2, \ldots, RTT_n\}$ is calculated as a final round trip time $RTT_F$, that is, $RTT_F=\min\{RTT_1, RTT_2, \ldots, RTT_n\}$; an average value of the n angles of arrival $\{\theta_1, \theta_2, \ldots, \theta_n\}$ is calculated as a final angle of arrival $AoA_F$, that is, $AoA_F=\text{Mean}\{\theta_1, \theta_2, \ldots, \theta_n\}$; and the position of the user equipment at the time t can be determined according to the calculated final round trip time $RTT_F$ and final angle of arrival $AoA_F$.

The setting of the above described sampling time window may conform to the following principle: a length of the set sampling time window should be adequate since if the length of the sampling time window is set to be too long, resources of the base station may be excessively occupied and the measurement may be inaccurate; and further, if the length of the sampling time window is set to be too short, the purpose of improving positioning accuracy can not be achieved.

According to an embodiment of the invention, the location information acquiring unit 102 calculates an error correction factor with a result of Global Navigation Satellite System assisted measurement as a reference value and corrects the positioning using the error correction factor.

The positioning method of the Global Navigation Satellite System has characteristics of high accuracy. Further, with the widespread of smart user equipment, more and more user equipment have the function of the Global Navigation Satellite System. Therefore, according to an embodiment of the invention, the measurement result of the Global Navigation Satellite System can be used to correct the positioning error of the round trip time, thereby further improving accuracy for positioning the user equipment. Specifically, the error correction factor $\beta_{RTT}$ can be calculated with the measurement result of the Global Navigation Satellite System as a standard value, and the positioning performed using the round trip time can be corrected using the calculated error correction factor $\beta_{RTT}$.

Certainly, the scene of using the Global Navigation Satellite System is not limited thereto. For example, if the error between the measurement result of the angle of arrival and the round trip time and the measurement result of the Global Navigation Satellite System is too large, or if the range of the cell is so small that the positioning accuracy of the angle of arrival and the round trip time can not meet the predetermined requirements, then the positioning can be performed using only the Global Navigation Satellite System. That is, as described above, the location information acquiring unit 102 may acquire the location information of the user equipment by receiving the measurement result of the Global Navigation Satellite System (GNSS) reported by the user equipment, in which the Global Navigation Satellite System (GNSS) may be for example the Global Positioning System (GPS). Further, when the base station needs more accurate positioning information, for example, when the inter-frequency adjacent cell measurement is triggered, the base station can also require the user equipment to immediately report the measurement result of the Global Navigation Satellite System.

According to the embodiment of the invention, when positioning the user equipment using the angle of arrival and the round trip time at the base station end, a positioning request is initiated at the base station end and the measurement of the angle of arrival and the round trip time is completed at the base station end independently, thereby realizing the positioning of the user equipment. Therefore, with the positioning method according to the embodiment of the invention, it is possible to simplify the flow for positioning the user equipment and reduce occupation of network signaling resources, without resulting in corresponding time delay, thereby improving efficiency for positioning the user equipment.

It is to be understood by those skilled in the art that the above manner for positioning the user equipment is only exemplary, and other methods for positioning the user equipment can also be used. Further, the above method for positioning the user equipment can also be applied to other situations. For example, the above described method for positioning the user equipment can also be applied to the following situations: providing positioning of the user equipment in scenes of emergency ambulance and emergency calling; providing location-based information service, e.g., navigation information and guidance service or the like; location triggered service, e.g., location-based management and charging or the like; services such as tracking and property management, vehicle scheduling/tracking, logistics monitoring, elder/children guardianship or the like.

Returning back to FIG. 1, the mobility state evaluating unit 104 in the device 100 may evaluate mobility state of the user equipment according to the location information of the user equipment at different time.

The mobility state evaluating unit 104 may acquire a plurality of location information of the user equipment at different time according to the above described method for acquiring the location information of the user equipment. For example, the mobility state evaluating unit 104 may acquire location information $p_1$ at time $t_1$, location information $p_2$ at time $t_2$, . . . , location information $p_i$, at time $t_i$, . . . , location information $p_j$ at time $t_j$, . . . , location information $p_n$ at time $t_n$ of the user equipment respectively, in which i, j and n are natural numbers and $1 \leq i \leq n$, $1 \leq j \leq n$. A time period $(t_i - t_j)$ between the time $t_i$ and the time $t_j$ can be obtained according to the two times, and a movement distance $(p_i - p_j)$ of the user equipment within the time period $(t_i - t_j)$ can be obtained according to the location information $p_i$, and the location information $p_j$. According to the obtained multiple time periods $(t_i - t_j)$ and the corresponding movement distances $(p_i - p_j)$ of the user equipment within the corresponding time periods $(t_i - t_j)$, the mobility state of the user equipment can be evaluated, for example, whether the user equipment is moving at a high speed, a middle speed or a low speed, or whether the user equipment is moving towards or away from the small cell, or the like.

According to an embodiment of the invention, the mobility state evaluating unit 104 is further adapted to calculate movement speed and/or movement direction of the user equipment according to the multiple location information of the user equipment at different time.

Following the above example, the movement speed of the user equipment within the time period $(t_i - t_j)$ can be obtained by dividing the movement distance $(p_i - p_j)$ of the user equipment within the time period $(t_i - t_j)$ by this time period $(t_i - t_j)$. Further, according to the multiple location information of the user equipment at different time, a movement locus of the user equipment can be estimated using methods of e.g. curve fitting or predicting, thereby estimating the movement direction of the user equipment.

Further, the user equipment can also utilize the positioning information of the Global Navigation Satellite System to calculate a total movement distance of the user equipment within a given time interval, and can also obtain the movement speed of the user equipment within the given time interval by dividing the total movement distance of the user equipment within the given time interval by the given time interval.

Returning back to FIG. 1, the executing unit 106 in the device 100 may execute corresponding operations related to small cell detection according to changes in the mobility state and the location information of the user equipment.

In general, whether to execute the small cell detection is related to the distance from the user equipment to the small cell. If the user equipment is far away from the small cell, the user equipment has a low probability of going into the small cell, and thus, it only needs to roughly evaluate the mobility state of the user equipment. If the user equipment is close to the small cell, then the user equipment has a high probability of going into the small cell, and thus, it might need to more accurately evaluate the mobility state of the user equipment so that the procedure of the small cell detection is started at appropriate timing.

According to an embodiment of the invention, the operations related to the small cell detection executed by the executing unit 106 include one or more of the following operations: judging, according to the distance between the user equipment and the small cell, whether the user equipment is approaching the small cell, or judging whether the user equipment satisfies an initial condition of the small cell detection.

For example, if the procedure of the small cell detection is started relatively early, unnecessary operations may be performed, and thus the system resources are wasted. Further, if the procedure of the small cell detection is started relatively late, then it might result in insufficiency of time for subsequent operations, thereby resulting in failure of the subsequent operations. Therefore, it needs to start the procedure of the small cell detection at appropriate timing. In order to start the procedure of the small cell detection at appropriate timing, for example, the distance between the user equipment and the small cell may be calculated according to the location information of the user equipment, and whether the user equipment is approaching the small cell can be judged according to the calculated distance between the user equipment and the small cell. When the user equipment appropriately approaches the small cell, it can be considered that it is appropriate to start the procedure of the small cell detection at this time. Further, when the procedure of the small cell detection is started, it can be judged whether the user equipment satisfies the initial condition of the small cell detection. For example, the initial condition of the small cell detection may be one or more of the following items: the user equipment is in non-high speed mobility state, the small cell is in good load condition and has remaining resources for access of the user equipment.

According to an embodiment of the invention, the multiple location information of the user equipment at different time may be obtained at a predetermined acquirement cycle, and the executing unit 106 is further adapted to update the acquirement cycle of the user equipment according to current movement speed of the user equipment.

The base station may acquire a plurality of location information of the user equipment at a predetermined acquirement cycle, for example, the base station may acquire the location information of the user equipment once every 500 ms. Further, the length of the above acquirement cycle is adjustable, for example, the length of the above acquirement cycle can be adjusted according to the current movement speed of the user equipment. For example, the larger the movement speed of the user equipment is, the faster the location information of the user equipment changes, and thus the acquirement cycle can be set shorter; and the smaller the movement speed of the user equipment is, the slower the location information of the user equipment changes, and thus the acquirement cycle can be set longer. It is to be understood by those skilled in the art that the length of the acquirement cycle can also be adjusted according to other factors.

Figure 3:
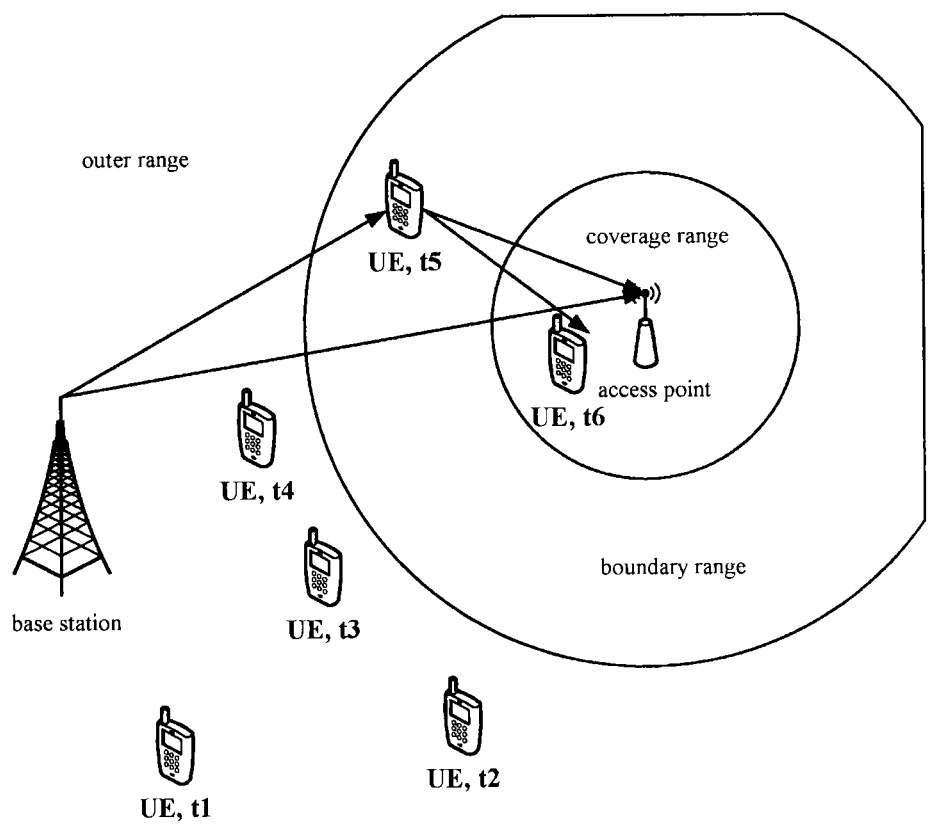
FIG. 3 is a schematic diagram illustrating dividing of a coverage region of a base station according to an embodiment of the invention.

A procedure of dividing coverage region of the base station is described in conjunction with FIG. 3 below. FIG. 3 is a schematic diagram illustrating dividing of the coverage region of the base station according to an embodiment of the invention.

According to an embodiment of the invention, the mobility state evaluating unit 104 is further adapted to determine a boundary range corresponding to the small cell according to a magnitude of the movement speed of the user equipment, and the executing unit 106 is further adapted to judge whether the user equipment is approaching the small cell by comparing the distance between the user equipment and the small cell with the boundary range.

As described above, the mobility state evaluating unit 104 may calculate the movement speed of the user equipment according to the multiple location information of the user equipment at different time. After calculating the movement speed of the user equipment, the mobility state evaluating unit 104 may determine the boundary range corresponding to the small cell according to the magnitude of the movement speed of the user equipment. In this invention, the boundary range corresponding to the small cell is used to measure a degree of closeness between the user equipment and the small cell. The user equipment can not successfully receive the signal of the small cell within the boundary range but may possibly approach the small cell. For the user equipment with different movement speeds, the same small cell has different boundar) ranges correspondingly. For example, the larger the movement speed of the user equipment is, more rapidly the user equipment may approach the small cell, and the larger the determined boundary range is; and the smaller the movement speed of the user equipment is, more slowly the user equipment may approach the small cell, and the smaller the determined boundary range is. As another example, the mobility state evaluating unit 104 may classify the movement speed of the user equipment as different levels such as a high speed level, a middle speed level and a low speed level, and movement speeds of different levels correspond to different boundary ranges respectively. For example, if the movement speed of the user equipment is at the high speed level, then the corresponding boundary range is relatively large; if the movement speed of the user equipment is at the low speed level, the corresponding boundary range is relatively small; and if the movement speed of the user equipment is at the middle speed level, the corresponding boundary range is between the relatively large boundary range and the relatively small boundary range.

Since the user equipment within the boundary range may possibly approach the small cell, the mobility state evaluating unit 104 may more carefully monitor the user equipment within the boundary range so as to evaluate the mobility state and calculate handover reaction time of the user equipment. Therefore, if the boundary range is determined as larger, the user equipment approaching the small cell can be subjected to careful monitoring earlier, and thus the accuracy of mobility state evaluation can be improved correspondingly, but the processing load of the mobility state evaluating unit 104 may be increased correspondingly. Therefore, it needs to determine the boundary range as having an appropriate magnitude so as to realize tradeoff between the evaluation accuracy of the user equipment and the processing load. Further, the boundary range further needs to satisfy the requirement of a minimum handover reaction time $t_{reaction}^{min}$ of the user equipment.

Figure 4:
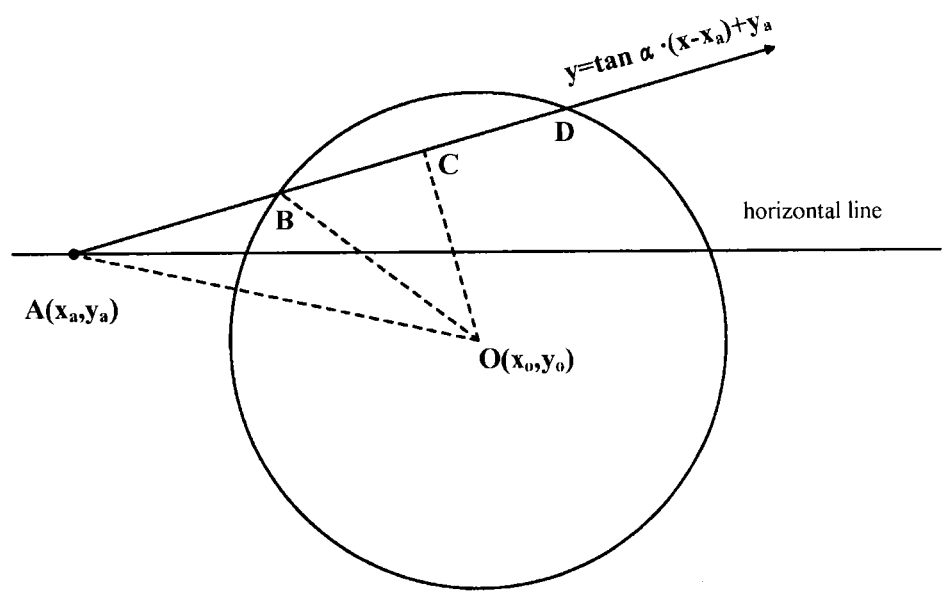
FIG. 4 is a schematic diagram illustrating evaluating mobility state of user equipment according to an embodiment of the invention.

Calculation of the handover reaction time for arrival of the user equipment at the coverage range of the small cell will be described in conjunction with FIG. 4 below. As shown in FIG. 4, the current position of the user equipment is $A(x_a, y_a)$, the movement direction (an intersection angle of an arrow indicating an advancement direction of the user equipment with respect to a horizontal line as shown in FIG. 4) of the user equipment is $\alpha$, and the movement speed of the user equipment at the position A $(x_a, y_a)$ is v. Further, a disposition position of the small cell (that is, a disposition position of an access point of the small cell) is $O(x_o, y_o)$, and a radius of the coverage range of the small cell is $R_c$. As shown in FIG. 4, the handover reaction time $t_{reaction}$ of the user equipment equals to time that the user equipment arrives at the coverage range (that is, a point B in FIG. 4) of the small cell from the current position $A(x_a, y_a)$ with the current movement speed v and the movement direction $\alpha$, and the handover reaction time $t_{reaction}$ of the user equipment within the boundary range should satisfy the following condition:

$$t_{reaction} \geq t_{reaction}^{min}.$$

As shown in FIG. 4, AB=AC−BC. Further, as can be seen from the Pythagorean theorem, $BC=\sqrt{OB^2-OC^2}$, and according to the above description, $OB=R_c$ and $$OC = \frac{|\tan\alpha \cdot x_o - y_o|}{\sqrt{(\tan\alpha)^2 + 1}}, \text{ then } BC = \sqrt{R_c^2 - \frac{(\tan\alpha \cdot x_o - y_o)^2}{(\tan\alpha)^2 + 1}}.$$

Further, as can be seen from the Pythagorean theorem, $AC=\sqrt{OA^2-OC^2}$, in which $OA=\sqrt{(x_o-x_a)^2+(y_o-y_a)^2}$ and $$OC = \frac{|\tan\alpha \cdot x_o - y_o|}{\sqrt{(\tan\alpha)^2 + 1}},$$

and thus $$AC = \sqrt{(x_o - x_a)^2 + (y_o - y_a)^2 - \frac{(\tan\alpha \cdot x_o - y_o)^2}{(\tan\alpha)^2 + 1}}.$$

Substituting the calculated values of AC and BC into the above formula AB=AC−BC, then it can be obtained $$AB = AC - BC = \sqrt{(x_o - x_a)^2 + (y_o - y_a)^2 - \frac{(\tan\alpha \cdot x_o - y_o)^2}{(\tan\alpha)^2 + 1}} - \sqrt{R_c^2 - \frac{(\tan\alpha \cdot x_o - y_o)^2}{(\tan\alpha)^2 + 1}}.$$

Since the movement speed of the user equipment at the position $A(x_a, y_a)$ is v, then $t_{reaction}=AB v$. Further, since the handover reaction time $t_{reaction}$ of the user equipment within the boundary range should satisfy the following condition $$t_{reaction} \geq t_{reaction}^{min}, \text{ then } AB/v \geq t_{reaction}^{min}, \text{ that is, } AB \geq V \times t_{reaction}^{min}.$$

As can be seen from this, the magnitude of the boundary range is positively related to the movement speed of the user equipment and is at least larger than or equal to $$V \times t_{reaction}^{min}.$$

It is to be understood by those skilled in the art that the minimum handover reaction time $t_{reaction}^{min}$ of the user equipment can be determined by experiments.

In one example of the invention, the boundary range corresponding to the small cell is a circle centered at the access point of the small cell. However, in actual environments, the boundary range may be not a perfect circle due to influence of various factors. Further, those skilled in the art should understand that using the circle to approximate the boundary range corresponding to the small cell is only for the purpose of simplifying modeling, and other shapes can also be used to approximate the boundary range corresponding to the small cell.

After determining the boundary range corresponding to the small cell, whether the user equipment is approaching the small cell can be judged by comparing the distance between the user equipment and the small cell (the access point of the small cell) with the boundary range. For example, if the distance between the user equipment and the small cell is smaller than or equal to the boundary range, the user equipment is located within the boundary range, which means that the user equipment is approaching the small cell. Further, if the distance between the user equipment and the small cell is larger than the boundary range, the user equipment is located outside the boundary range, which means that the user equipment is far away from the small cell and is not approaching the small cell.

Further, according to an embodiment of the invention, the mobility state evaluating unit 104 is further adapted to classify the small cells adjacent to each other into the same cluster, and to calculate a union of boundary ranges corresponding to the respective small cells in the same cluster as a boundary range corresponding to the same cluster.

Regarding a region where the distribution of the small cells is dense, since the inter-small cell distance is small, it might need to judge whether the user equipment is approaching each small cell successively, thereby resulting in low processing efficiency of the system. Therefore, for the region where the distribution of the small cells is dense, the mobility state evaluating unit 104 may classify the small cells close to each other into the same cluster. For each small cell within the cluster, the boundary range corresponding to each of the small cells is determined respectively. Then, the union of the determined boundary ranges is calculated as the boundary range corresponding to the same cluster. In this case, the obtained boundary range corresponding to the same cluster is no longer a circle. By classifying the small cells close to each other into the same cluster, it is unnecessary to judge whether the user equipment is approaching each small cell successively, but it can be directly judged whether the user equipment is approaching this cluster, thereby reducing the number of times of judging and improving the processing efficiency of the system.

Further, the mobility state evaluating unit 104 may further determine the coverage range of the small cell according to the signal quality of the small cell. In this invention, the coverage range of the small cell generally refers to a region where the user equipment can normally receive the signal of the small cell and obtain normal service quality. For example, the mobility state evaluating unit 104 may determine the coverage range of the small cell according to Reception Signal Strength and/or Carrier to Interference plus Noise Ratio of the small cell. Specifically, a value of the signal quality can be defined as a threshold of the coverage range of the small cell, which might be a value of the signal quality of the small cell when the user equipment triggers measurement reporting of handover. Then, the coverage range of the small cell can be determined by obtaining the signal quality distribution condition around the small cell and comparing it with the threshold of the coverage range of the small cell. The signal quality distribution of the small cell can be measured in advance at the time of actual disposition, and can also be obtained from the measurement report of the user equipment. Further, the coverage range of the small cell is also related to transmission power of the small cell, and according to a formula of large scale fading, corresponding variation in the coverage range of the small cell when the transmission power of the small cell changes can be approximately derived.

In general, the coverage range of the small cell is also a circle centered at the access point of the small cell. Further, as shown in FIG. 3, the coverage range of the small cell is a circle concentric with the above boundary range, and the radius of the coverage range is smaller than the radius of the boundary range. However, in actual environments, due to influence of various factors, the coverage range of the small cell might be not a perfect circle, and the magnitude of the radius of the coverage range of the small cell might be different from a reference value given in the standard. Further, those skilled in the art should appreciate that using a circle to approximate the coverage range of the small cell is only for the purpose of simplifying modeling, and other shapes can also be used to approximate the coverage range of the small cell of course.

According to an embodiment of the invention, the mobility state evaluating unit 104 is further adapted to classify the movement speed of the user equipment into different speed levels, and the executing unit 106 is further adapted to classify the position at which the user equipment is located into different regions using region dividing criteria corresponding to the speed levels of the user equipment.

As shown in FIG. 3, since the position of the base station is fixed, the coverage region of the base station can be determined. In order to improve the accuracy for positioning the user equipment and reduce load of the base station connected to the user equipment currently, the position at which the user equipment is located can be classified into different regions using the region dividing criteria corresponding to the speed levels of the user equipment. For example, the mobility state evaluating unit 104 may divide the movement speed of the user equipment into three levels such as a high speed level, a middle speed level and a low speed level, and the executing unit 106 may classify the position at which the user equipment is located as different regions using the region dividing criteria corresponding to the high speed level, the middle speed level and the low speed level respectively. Specifically, if the movement speed of the user equipment is at the high speed level, the coverage region of the base station can be divided into an outer region a1, a middle region b1 and an inner region c1 according to the distance from the small cell in a descending order, that is, the region dividing criteria corresponding to the high speed level of the user equipment is the outer region a1, the middle region b1 and the inner region c1. If the movement speed of the user equipment is at the middle speed level, the coverage region of the base station can be divided into an outer region a2, a middle region b2 and an inner region c2 according to the distance from the small cell in a descending order, that is, the region dividing criteria corresponding to the middle speed level of the user equipment is the outer region a2, the middle region b2 and the inner region c2. If the movement speed of the user equipment is at the low speed level, the coverage region of the base station can be divided into an outer region a3, a middle region b3 and an inner region c3 according to the distance from the small cell in a descending order, that is, the region dividing criteria corresponding to the low speed level of the user equipment is the outer region a3, the middle region b3 and the inner region c3. Particularly, the outer regions a1, a2 and a3 are located outside the boundary range corresponding to the small cell (an outer range as shown in FIG. 3), the middle regions b1, b2 and b3 are located between the boundary range corresponding to the small cell and the coverage range of the small cell, and the inner regions c1, c2 and c3 are surrounded by the coverage range of the small cell.

As described above, in a case that the signal quality of the small cell is determined, it can be determined that the coverage range of the small cell is the same, that is, for the user equipment with the movement speed in different levels of the high speed level, the middle speed level and the low speed level, the radiuses of the divided inner regions c1, c2 and c3 may be the same. Further, as described above, since the boundary range corresponding to the user equipment with the movement speed at the high speed level is larger, the boundary range corresponding to the user equipment with the movement speed at the low speed level is smaller, and the boundary range corresponding to the user equipment with the movement speed at the middle speed level is between the larger boundary range and the smaller boundary range, for different levels of the high speed level, the middle speed level and the low speed level of the movement speed of the user equipment, the radiuses of the divided middle regions b1, b2 and b3 may have the following relationship: b1>b2>b3, and accordingly, the radiuses of the divided outer regions a1, a2 and a3 may have the following relationship: a1<a2<a3.

As described above, the mobility state evaluating unit 104 may evaluate the mobility state of the user equipment and may calculate the movement speed and/or movement direction of the user equipment according to the multiple location information of the user equipment at different time. After calculating the movement speed of the user equipment, it can be determined at which level of the above different speed levels the calculated movement speed of the user equipment is, thereby determining using the region dividing criteria corresponding to the speed level of the user equipment. For example, it can be determined at which of the high speed level, the middle speed level and the low speed level the movement speed of the user equipment is, thereby determining whether to adopt the region dividing criteria "outer region a1, middle region b1 and inner region c1" corresponding to the high speed level of the user equipment, to adopt the region dividing criteria "outer region a2, middle region b2 and inner region c2" corresponding to the middle speed level of the user equipment, or to adopt the region dividing criteria "outer region a3, middle region b3 and inner region c3" corresponding to the low speed level of the user equipment. Therefore, if the mobility state of the user equipment changes, for example, if the movement speed of the user equipment changes to a different speed level, it only needs to accordingly modify the region dividing criteria corresponding thereto.

After determining the region dividing criteria corresponding to the speed level of the user equipment according to the movement speed of the user equipment, the position at which the user equipment is located can be classified, using the region dividing criteria corresponding to the speed level of the user equipment, into different regions according to the distance between the user equipment and the access point of the small cell, and different position updating strategies can be set for different regions.

For example, if the movement speed of the user equipment is at the high speed level, then it can be determined that the region dividing criteria corresponding to the high speed level of the user equipment is the outer region a1, the middle region b1 and the inner region c1. Therefore, the distance D between the user equipment and the small cell can be compared with the radius $R_{b1}$ of the above middle region b1 and the radius $R_{c1}$ of the above inner region, and the position at which the user equipment is located can be classified into different regions according to the comparison result. Specifically, if $D \leq R_{c1}$, then the position at which the user equipment is located can be classified into the inner region; if $R_{c1} < D \leq R_{b1}$, then the position at which the user equipment is located can be classified into the middle region; and if $R_{a1} > D > R_{b1}$, the position at which the user equipment is located can be classified into the outer region (the outer range as shown in FIG. 3). Further, the processing manner when the movement speed of the user equipment is at the middle speed level or the low speed level is similar to the processing manner when the movement speed of the user equipment is at the high speed level, and details thereof will not be repeated.

When the user equipment is located in the outer region, for example, the user equipment at times t1, t2, t3 and t4 as shown in FIG. 3, since the user equipment is far away from the small cell, the base station only needs to update the location information of the user equipment every a time period and calculate the movement speed of the user equipment according to the multiple location information of the user equipment. When the user equipment is located in the middle region, for example, the user equipment at time t5 as shown in FIG. 3, the user equipment is located within the boundary range at this time but does not go into the coverage range of the small cell, which means the user equipment has been close to the small cell at this time and may possibly continue going into the inner region (that is, the coverage range of the small cell). Therefore, the base station needs to more accurately acquire the changes in the mobility state and the location information of the user equipment so as to judge whether the user equipment will go into the coverage range of the small cell, so that when it is discovered that the user equipment is very close to the inner region (that is, the coverage range of the small cell), it is considered to trigger the inter-frequency adjacent cell measurement procedure of the user equipment. When the user equipment is located in the inner region, for example, the user equipment at time t6 as shown in FIG. 3, the inter-frequency adjacent cell measurement procedure of the user equipment has possibly been triggered, and thus the base station will trigger the inter-frequency cell handover procedure and/or carrier loading procedure of the user equipment at appropriate timing according to the measurement report of the user equipment and the mobility state of the user equipment.

According to an embodiment of the invention, the multiple location information of the user equipment at different time is obtained at the predetermined acquirement cycle, and the executing unit 106 is further adapted to set a longer acquirement cycle if the user equipment is located outside the boundary range, and to set a shorter acquirement cycle if the user equipment is located within the boundary range.

The base station may acquire the multiple location information of the user equipment at the predetermined acquirement cycle, for example, the base station may acquire the location information of the user equipment once every 500 ms. Further, the length of the above acquirement cycle is adjustable, for example, the length of the above acquirement cycle can be adjusted according to the actual position at which the user equipment is located. Specifically, as shown in FIG. 3, when the user equipment is located outside the boundary range, i.e., when the user equipment is located in the outer range, since the user equipment is far away from the small cell, the base station only needs to acquire rough location information of the user equipment, and the acquirement cycle can be set longer. Further, as shown in FIG. 3, when the user equipment is located within the boundary range, since the user equipment may possibly continue going into the coverage range of the small cell, the base station needs to more accurately acquire the changes in the mobility state and the location information of the user equipment so as to judge whether the small cell has been discovered, and the acquirement cycle can be set shorter. Further, the length of the above acquirement cycle can be adjusted according to the movement speed of the user equipment. For example, the larger the movement speed of the user equipment is, the faster the location information of the user equipment changes, and thus the acquirement cycle can be set shorter; and the smaller the movement speed of the user equipment is, the slower the location information of the user equipment changes, and thus the acquirement cycle can be set longer. Those skilled in the art should appreciate that the length of the acquirement cycle can also be adjusted according to other factors.

According to an embodiment of the invention, the executing unit 106 is further adapted to judge whether the user equipment satisfies the initial condition of the small cell detection if the user equipment is located within the boundary range, and the above initial condition is one or more of the following items: the user equipment is in the non-high speed mobility state, and the small cell is in a good load condition and has remaining resources for access of the user equipment.

As shown in FIG. 3, when the user equipment is located outside the boundary range, that is, when the user equipment is located within the outer range, since the user equipment is far away from the small cell, it is unnecessary to judge whether the user equipment satisfies the initial condition of the small cell detection at this time. However, when the user equipment is located within the boundary range, since the user equipment may possibly continue going into the coverage range of the small cell, it is judged whether the user equipment satisfies the initial condition of the small cell detection only if the user equipment is located within the boundary range. Thus, it can be determined when to start the small cell detection procedure according to the actual position at which the user equipment is located, and thus it is possible to save resources and improve the efficiency of the small cell detection.

According to actual conditions, the initial condition of small cell detection may be one or more of the above items. In the heterogeneous network, the small cells are mainly disposed in populous areas, e.g., super markets, shopping malls, offices or the like, and the main purpose thereof is to share service of the base station. Therefore, if user equipment moving at high speed appears in the above populous areas, it generally will not stay but just passes by. Therefore, if the user equipment is in the high speed mobility state, it should not perform small cell detection for the user equipment and switch the user equipment to the small cell. That is to say, the small cell detection procedure can be performed in a case that the user equipment is in the non-high speed mobility state. Further, considering the load balance problem, the small cell detection procedure can be performed in a case that the small cell is in a good load condition and has remaining resources for access of the user equipment. Those skilled in the art should understand that the above initial condition is only exemplary but not limitation.

The procedure of evaluating the mobility state of the user equipment is described in conjunction with FIG. 4 below. FIG. 4 is a schematic diagram illustrating evaluating the mobility state of the user equipment according to an embodiment of the invention.

According to an embodiment of the invention, the mobility state evaluating unit 104 is further adapted to calculate, according to the location information, the movement speed and the movement direction of the user equipment, stay time $t_{stay}$, required for the user equipment to pass through the small cell, and to compare the calculated stay time $t_{stay}$ with a predetermined stay time threshold $T_{stay}$ to evaluate whether the user equipment is in the non-high speed mobility state.

As shown in FIG. 4, the current position of the user equipment is A ($x_a$, $y_a$), the movement direction of the user equipment (that is, an intersection angle of an arrow indicating the advancement direction of the user equipment with respect to the horizontal line as shown in FIG. 4) is $\alpha$, and the movement speed of the user equipment at the position A ($x_a$, $y_a$) is v. Further, the disposition position of the small cell (that is, the disposition position of the access point of the small cell) is O ($x_o$, $y_o$), and the radius of the coverage range of the small cell is $R_c$.

According to the current position A($x_a$, $y_a$) of the user equipment and the movement direction $\alpha$ of the user equipment, the movement locus of the user equipment can be predicted as $y=\tan \alpha \cdot (x-x_a)+y_a$.

The above movement locus $y=\tan \alpha \cdot (x-x_a)+y_a$ can be represented in a straight line form of $\tan \alpha \cdot x+(-1 \cdot y)+(-\tan \alpha \cdot x_a+y_a)=0$, and thus coefficients E, F and G of this straight line are: E=$\tan \alpha$, F=$-1$, G=$-\tan \alpha \cdot x_a+y_a$. The distance from the disposition position O ($x_o$, $y_o$) of the small cell to the above straight line y can be calculated according to a calculation formula of a point-to-line distance as follows:

$$OC = \frac{|E \cdot x_o + F \cdot y_o|}{\sqrt{E^2 + F^2}},$$

substituting the coefficients E=$\tan \alpha$ and F=$-1$ into the above formula, it can be obtained $$OC = \frac{|\tan\alpha \cdot x_o - y_o|}{\sqrt{(\tan\alpha)^2 + 1}}.$$

Next, as can be seen from the Pythagorean theorem, BD=2·BC=2·$\sqrt{OB^2-OC^2}$, substituting OB=$R_b$ and $$OC = \frac{|\tan\alpha \cdot x_o - y_o|}{\sqrt{(\tan\alpha)^2 + 1}}$$

into the above formula, it can be obtained $$BD = 2 \cdot \sqrt{R_c^2 - \frac{(\tan\alpha \cdot x_o - y_o)^2}{(\tan\alpha)^2 + 1}}.$$

Therefore, according to a stay distance BD of the user equipment within the small cell and the speed v of the user equipment, the stay time required for the user equipment to pass through the small cell can be calculated as:

$$t_{stay} = BD/v = \frac{2 \cdot \sqrt{R_c^2 - \frac{(\tan\alpha \cdot x_o - y_o)^2}{(\tan\alpha)^2 + 1}}}{v}.$$

After calculating the stay time $t_{stay}$, the calculated stay time $t_{stay}$ can be compared with the predetermined stay time threshold $T_{stay}$ to evaluate whether the user equipment is in the non-high speed mobility state. For example, if $t_{stay} < T_{stay}$, it can be considered that the user equipment is in the high speed mobility state, and thus if the user equipment is switched to the small cell, experience for a user holding the user equipment will become worse. Further, if $t_{stay} \geq T_{stay}$, it can be considered that the user equipment is in the non-high speed mobility state, and thus the small cell detection procedure of the user equipment can be triggered. Those skilled in the art should understand that the predetermined stay time threshold $T_{stay}$ can be determined by experiments.

Figure 5:
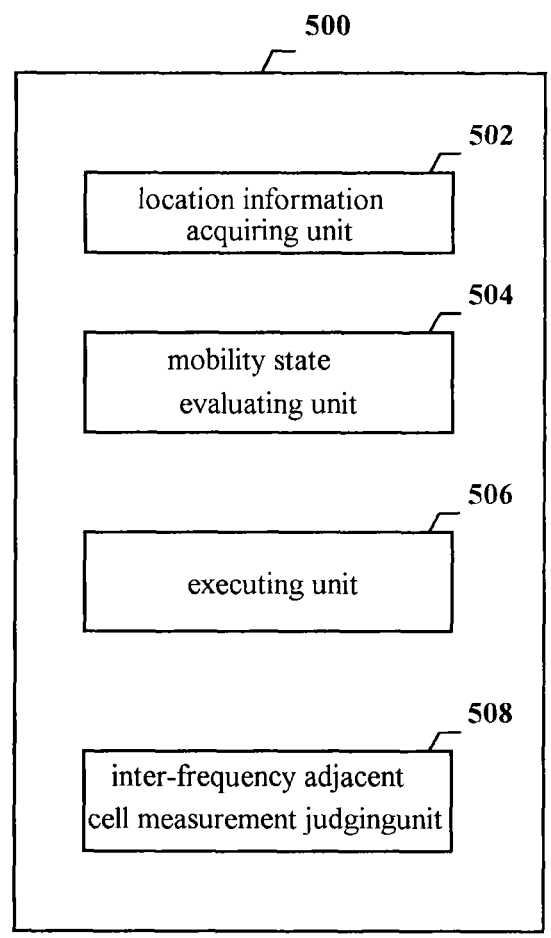
FIG. 5 is a block diagram illustrating another configuration of the device in the wireless communication system according to an embodiment of the invention.

Another configuration of a device in a wireless communication system according to an embodiment of the invention will be described with reference to FIG. 5 below. FIG. 5 is a block diagram illustrating another configuration of a device in a wireless communication system according to an embodiment of the invention.

As shown in FIG. 5, the device 500 in the wireless communication system includes a location information acquiring unit 502, a mobility state evaluating unit 504, an executing unit 506 and an inter-frequency adjacent cell measurement judging unit 508. The configurations of the location information acquiring unit 502, the mobility state evaluating unit 504 and the executing unit 506 are the same as those of the location information acquiring unit 102, the mobility state evaluating unit 104 and the executing unit 106 in the device 100 as shown in FIG. 1 respectively, and thus no specific details thereof will be repeated. Hereinafter, the inter-frequency adjacent cell measurement judging unit 508 in the device 500 will be described in detail.

As shown in FIG. 5, the inter-frequency adjacent cell measurement judging unit 508 may judge whether to trigger the inter-frequency adjacent cell measurement of the user equipment.

For example, if the user equipment satisfies the initial condition of the small cell detection, it means that the user equipment is close to the coverage range of the small cell and will go into the coverage range of the small cell soon. At this time, it needs to trigger the measurement for the signal quality of the adjacent cell by the user equipment at appropriate timing, and report the measured signal quality of the adjacent cell to the base station. As described above, the initial condition of the small cell detection is one or more of the following items: the user equipment is in the non-high speed mobility state, and the small cell is in a good load condition and has remaining resources for access of the user equipment. Further, regarding configuration of the cell measurement, section 10.1.3 in 3GPP TS 36.300 and section 5.5.4 in 3GPP TS 36.331 may be referred to.

If the serving cell where the user equipment is located and the adjacent cell are on the same frequency band, that is, in case of intra-frequency measurement, the above measurement has no great problem. However, for the case of inter-frequency, that is, in case of inter-frequency measurement, the above measurement is not appropriate. For the case of inter-frequency, since the user equipment has only one transceiver, only information on one frequency band can be received at the same time. Therefore, in order to realize the inter-frequency cell measurement, a concept of "measurement gap" needs to be introduced.

In section 8.1.2.1 of 3GPP TS 36.311, the measurement gap is defined as follows: within the measurement gap, the user equipment does not send any data and will not tune a receiver of the user equipment onto the frequency band of the serving cell in E-UTRAN. In an uplink subframe immediately after the measurement gap, the user equipment of Frequency Division Duplexing (FDD) in E-UTRAN will not transmit any data, and if the subframe before the measurement gap is a downlink subframe, the user equipment of Time Division Duplexing (TDD) in E-UTRAN will not transmit any data.

When configuring the measurement gap, MeasGapConfig IE can be configured using a RRC_Connection_Reconfiguration message, and the base station notifies the user equipment of parameters related to the measurement gap, e.g., a start point of the measurement gap, a length of the measurement gap, number of the measurement gaps and the like. Further, two measurement gap modes that can be supported by the user equipment have also been given in 3GPP TS 36.133, and 3GPP TS 36.133 can be referred to for details, and thus no details will be repeated herein. Therefore, the above problem as how to trigger the measurement for the signal quality of the adjacent cell by the user equipment at appropriate timing is actually a problem as when to configure the measurement gap.

According to an embodiment of the invention, the mobility state evaluating unit 504 is further adapted to calculate the reaction time for arrival of the user equipment at the coverage range of the small cell according to the location information, the movement speed and the movement direction of the user equipment, and the inter-frequency adjacent cell measurement judging unit 508 is further adapted to compare the calculated reaction time with a predetermined reaction time threshold to judge whether to trigger the inter-frequency adjacent cell measurement of the user equipment.

With the increase of the movement speed of the user equipment, the reaction time left for the user equipment to perform corresponding operations continuously decreases, which is one of the most important reasons that Handover Failure (HOF) of the user equipment increases as the speed increases. In order to ensure the inter-frequency adjacent cell measurement of the user equipment can be triggered in time, sufficient reaction time should be reserved for the user equipment. In this embodiment, the reaction time $t_{reaction}$ of the user equipment indicates time that the user equipment arrives at the coverage range of the small cell from the current position according to the current mobility state (e.g., the current movement speed and movement direction of the user equipment).

How to calculate the reaction time for arrival of the user equipment at the coverage range of the small cell has been described in conjunction with FIG. 4 above. As shown in FIG. 4, the current position of the user equipment is $A(x_a, y_a)$, the movement direction of the user equipment (i.e., an intersection angle of an arrow indicating the advancement direction of the user equipment with respect to the horizontal line as shown in FIG. 4) is a, and the movement speed of the user equipment at the position $A(x_a, y_a)$ is v. Further, the disposition position of the small cell (i.e., the disposition position of the access point of the small cell) is $O(x_o, y_o)$, and the radius of the coverage range of the small cell is $R_b$.

As shown in FIG. 4, the reaction time $t_{reaction}$ of the user equipment equals to the time that the user equipment arrives at the coverage range (i.e., the point B in FIG. 4) of the small cell from the current position A ($x_a$, $y_a$) with the current movement speed v and movement direction α.

As shown in FIG. 4, AB=AC−BC. Further, as can be seen from the Pythagorean theorem, BC=$\sqrt{OB^2-OC^2}$, and as can be seen from the above description, OB=$R_b$ and $$OC = \frac{|\tan\alpha \cdot x_o - y_o|}{\sqrt{(\tan\alpha)^2 + 1}}, \text{ and thus } BC = \sqrt{R_c^2 - \frac{(\tan\alpha \cdot x_o - y_o)^2}{(\tan\alpha)^2 + 1}}.$$

Further, as can be seen from the Pythagorean theorem, AC=$\sqrt{OA^2-OC^2}$, in which OA=$\sqrt{(x_o-x_a)^2+(y_o-y_a)^2}$ and $$OC = \frac{|\tan\alpha \cdot x_o - y_o|}{\sqrt{(\tan\alpha)^2 + 1}},$$

and thus $$AC = \sqrt{(x_o - x_a)^2 + (y_o - y_a)^2 - \frac{(\tan\alpha \cdot x_o - y_o)^2}{(\tan\alpha)^2 + 1}}.$$

Substituting the calculated values of AC and BC into the above formula AB=AC−BC, then it can be obtained:

$$AB = AC - BC = \sqrt{(x_o - x_a)^2 + (y_o - y_a)^2 - \frac{(\tan\alpha \cdot x_o - y_o)^2}{(\tan\alpha)^2 + 1}} - \sqrt{R_c^2 - \frac{(\tan\alpha \cdot x_o - y_o)^2}{(\tan\alpha)^2 + 1}}.$$

The movement speed of the user equipment at the position A ($x_a$, $y_a$) is v, and thus $t_{reaction}$=AB/v.

After calculating the reaction time $t_{reaction}$ of the user equipment, the calculated reaction time $t_{reaction}$ can be compared with the predetermined reaction time threshold $T_{reaction}$ to judge whether to trigger the inter-frequency adjacent cell measurement of the user equipment. For example, if $t_{reaction}<T_{reaction}$, it can be considered that the user equipment is close to the small cell, and it should start triggering the inter-frequency cell measurement of the user equipment. Those skilled in the art should understand that the predetermined reaction time threshold $T_{reaction}$ can be determined by experiments.

However, since variation in actual wireless channels is very complex, the coverage range of the small cell is not a regular circle. Therefore, after configuring the measurement gap, the following cases might occur: a) the small cell has been detected very quickly (for example, before positioning the user equipment next time) and the small cell handover has been completed successfully; b) the small cell has been detected very quickly but no small cell handover is performed; c) the small cell has been detected very quickly but the small cell handover failure occurs; d) the small cell has been detected after a period of time (for example, after positioning the user equipment next time); or e) the small cell has not been detected after elapse of very long time.

It is to be noted that since the inter-frequency cell handover is always triggered based on events, e.g., an A3 event or the like. An entry condition of the A3 event is that the signal quality (e.g., RSRP value-based or RSRQ value-based) of the adjacent cell is higher than an offset amount with respect to the serving cell. After triggering the A3 event, the user equipment may be configured to perform measurement report periodically. Therefore, if the measurement report regarding the small cell by the user equipment has been detected, it can be considered that the small cell has been detected currently.

Further, detection time $t_{detect}$ can be used to indicate time from triggering of the inter-frequency cell measurement to satisfying of the A3 event triggering condition. The detection time $t_{detect}$ can be compared with a predetermined minimum detection time threshold $T_{detect}^{min}$ and a predetermined maximum detection time threshold $T_{detect}^{max}$, if $t_{detect}<T_{detect}^{min}$, it is considered that the small cell has been detected very quickly at present, and if $t_{detect}>T_{detect}^{max}$, it is considered that the small cell has not been detected for a very long time. Those skilled in the art should understand that the predetermined minimum detection time threshold $T_{detect}^{min}$ and the predetermined maximum detection time threshold $T_{detect}^{max}$ can be determined by experiments. Further, the measurement gap can be shut off through the RRC_Connection_Reconfiguration message.

Next, various cases will be analyzed respectively. For the case a), this means it is most appropriate to trigger the inter-frequency adjacent cell measurement at this time, the user equipment reduces the number of times of unnecessary inter-frequency adjacent cell measurement as much as possible, and inter-frequency adjacent cell handover has been completed successfully. For the case b), this means it is also appropriate to trigger the inter-frequency adjacent cell measurement at this time, but the user equipment has changed its mobility state, for example, the user equipment has changed its movement direction, and thus handover is no longer required. For the case c), this means the inter-frequency adjacent cell measurement has been triggered late, resulting in insufficiency of the reaction time, and thus handover failure occurs. For the case d), this means the inter-frequency adjacent cell measurement has been triggered early, resulting in excessive number of times of the inter-frequency adjacent cell measurement. For the case e), this means no small cell has been detected, and thus the inter-frequency adjacent cell detection fails.

Further, according to an embodiment of the invention, when judging whether to trigger the inter-frequency adjacent cell measurement of the user equipment, the positioning information of the Global Navigation Satellite System reported by the user equipment is received, and the movement speed and/or movement direction or the like of the user equipment is calculated according to the reported positioning information of the Global Navigation Satellite System.

Since the positioning information of the Global Navigation Satellite System is more accurate, when the base station needs more accurate positioning information, for example, when triggering the inter-frequency adjacent cell measurement of the user equipment, the user equipment may be requested to report the positioning information of the Global Navigation Satellite System to the base station. According to the reported positioning information of the Global Navigation Satellite System, the base station may calculate the movement speed and/or movement direction or the like of the user equipment.

According to an embodiment of the invention, the mobility state evaluating unit 504 is further adapted to divide the boundary range into a plurality of sub-regions, each sub-region corresponding to a predetermined triggering probability, and is further adapted to judge a sub-region where the user equipment is located and a corresponding triggering probability according to the location information of the user equipment; and the inter-frequency adjacent cell measurement judging unit 508 is further adapted to trigger the inter-frequency adjacent cell measurement of the user equipment according to the determined triggering probability corresponding to the sub-region where the user equipment is located.

As described above, in actual scenes, the coverage range of the small cell is very irregular, the circle is used to approximate the coverage range of the small cell from the view of simplifying modeling, thereby facilitating evaluation of the mobility state. However, in the triggering of the inter-frequency adjacent cell measurement, it needs to consider the actual coverage range of the small cell. For example, the boundary range may be divided into a plurality of sub-regions according to the angle and/or distance with respect to the small cell, each sub-region corresponding to a predetermined triggering probability. For the user equipment satisfying triggering of the inter-frequency adjacent cell measurement, the base station judges the sub-region where the user equipment is located and its corresponding triggering probability according to the location information of the user equipment, and triggers the inter-frequency adjacent cell measurement of the user equipment according to the determined triggering probability corresponding to the sub-region where the user equipment is located. It is to be noted that the triggering probability may be related to factors such as whether the user equipment uses the assistance of the Global Navigation Satellite System, past success rate of small cell detection or the like.

Figure 6:
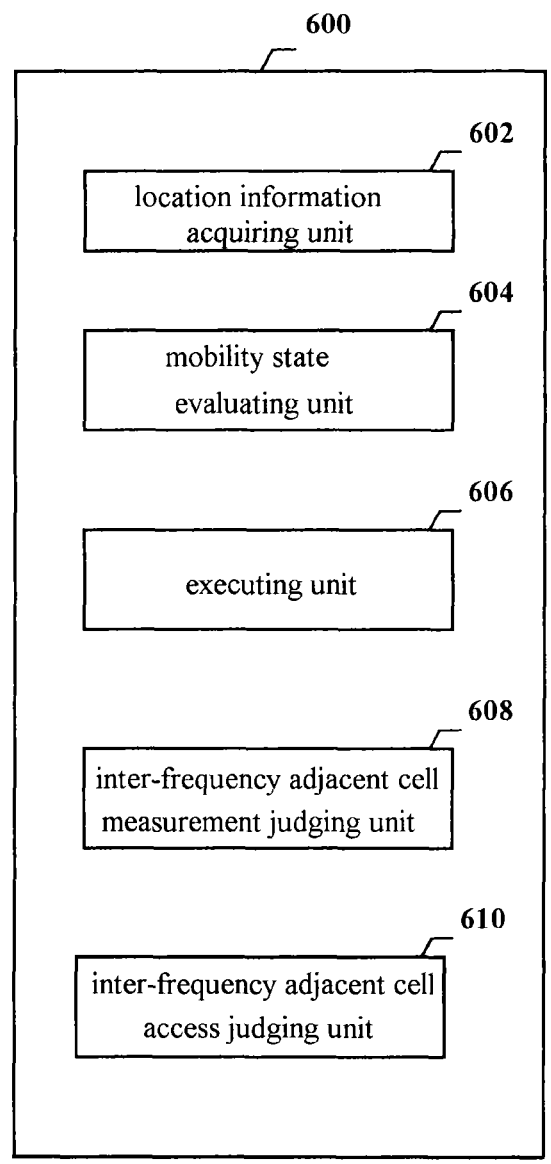
FIG. 6 is a block diagram illustrating yet another configuration of the device in the wireless communication system according to an embodiment of the invention.

Another configuration of a device in a wireless communication system according to an embodiment of the invention will be described with reference to FIG. 6 below. FIG. 6 is a block diagram illustrating another configuration of a device in a wireless communication system according to an embodiment of the invention.

As shown in FIG. 6, the device 600 in the wireless communication system includes a location information acquiring unit 602, a mobility state evaluating unit 604, an executing unit 606, an inter-frequency adjacent cell measurement judging unit 608 and an inter-frequency adjacent cell access judging unit 610. Configurations of the location information acquiring unit 602, the mobility state evaluating unit 604, the executing unit 606 and the inter-frequency adjacent cell measurement judging unit 608 are the same as those of the location information acquiring unit 502, the mobility state evaluating unit 504, the executing unit 506 and the inter-frequency adjacent cell measurement judging unit 508 in the device 500 as shown in FIG. 5 respectively, and thus no specific details thereof will be repeated herein. Hereinafter, the inter-frequency adjacent cell access judging unit 610 in the device 600 will be described in detail.

As shown in FIG. 6, the inter-frequency adjacent cell access judging unit 610 may judge, according to the measurement report of the user equipment and the location information of the user equipment, whether to the trigger the inter-frequency cell handover and/or carrier loading of the user equipment, in a case that the inter-frequency adjacent cell measurement of the user equipment has been triggered.

As described above, since the inter-frequency cell handover is always triggered based on events, for example, the A3 event or the like. The entry condition of the A3 event is the signal quality (for example, RSRP value-based or RSRQ value-based) of the adjacent cell is higher than the offset amount with respect to the serving cell. After triggering the A3 event, the user equipment may be configured to perform measurement report periodically. Therefore, in a case that the user equipment has triggered the inter-frequency adjacent cell measurement, the base station may trigger the inter-frequency adjacent cell handover or carrier loading procedure at appropriate timing according to the measurement report of the user equipment and the location information of the user equipment.

Figure 7:
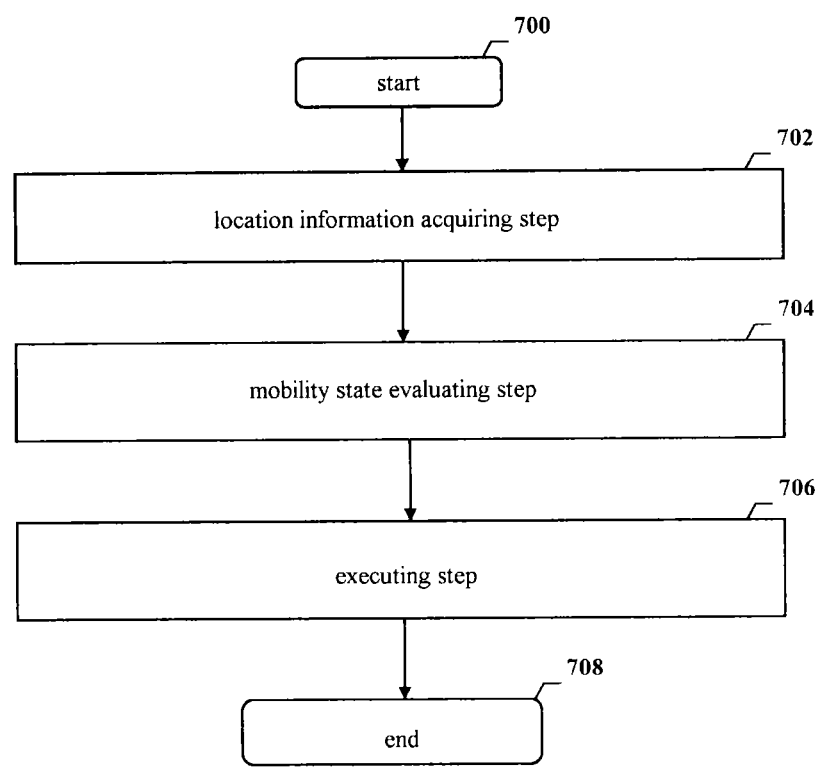
FIG. 7 is a flow chart illustrating a method for use in a wireless communication system according to an embodiment of the invention.

A method for use in a wireless communication system according to an embodiment of the invention will be described with reference to FIG. 7 below. FIG. 7 is a flow chart illustrating a method for use in a wireless communication system according to an embodiment of the invention.

As shown in FIG. 7, the method begins with step 700. After the step 700, the method proceeds to step 702.

The step 702 is a location information acquiring step. At the step 702, the location information of the user equipment is acquired.

After the step 702, the method proceeds to step 704.

The step 704 is a mobility state evaluating step. At the step 704, the mobility state of the user equipment is evaluated according to the location information of the user equipment at different time.

After the step 704, the method proceeds to step 706.

The step 706 is an executing step. At the step 706, corresponding operations related to small cell detection are executed according to changes in the mobility state and the location information of the user equipment.

The method as shown in FIG. 7 is a method corresponding to the device described in FIG. 1, and specific details thereof will not be repeated herein.

Figure 8:
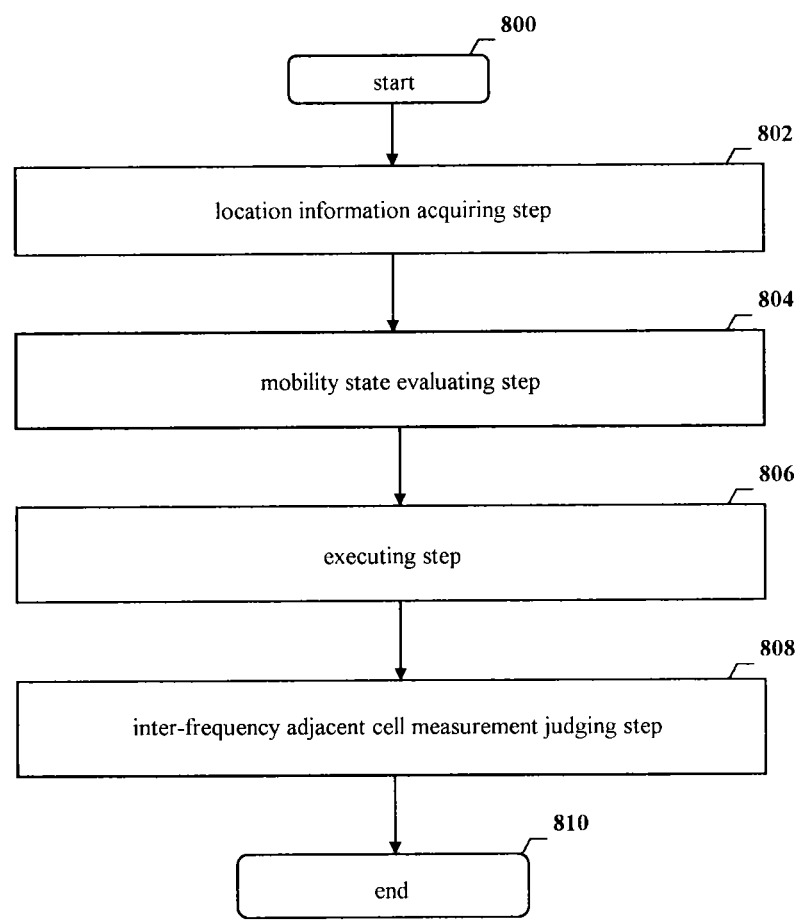
FIG. 8 is a flow chart illustrating a method for use in a wireless communication system according to another embodiment of the invention.

A method for use in a wireless communication system according to another embodiment of the invention will be described with reference to FIG. 8 below. FIG. 8 is a flow chart illustrating a method for use in a wireless communication system according to another embodiment of the invention.

As shown in FIG. 8, the method begins with step 800. After the step 800, the method proceeds to step 802.

The step 802 is a location information acquiring step. At the step 802, the location information of the user equipment is acquired.

After the step 802, the method proceeds to step 804.

The step 804 is a mobility state evaluating step. At the step 804, the mobility state of the user equipment is evaluated according to the location information of the user equipment at different time.

After the step 804, the method proceeds to step 806.

The step 806 is an executing step. At the step 806, corresponding operations related to the small cell detection are executed according to changes in the mobility state and the location information of the user equipment.

After the step 806, the method proceeds to step 808.

The step 808 is an inter-frequency adjacent cell measurement judging step. At the step 808, it can be judged whether to trigger the inter-frequency adjacent cell measurement of the user equipment.

The method as shown in FIG. 8 is a method corresponding to the device described in FIG. 5, and specific details thereof will not be repeated herein.

Figure 9:
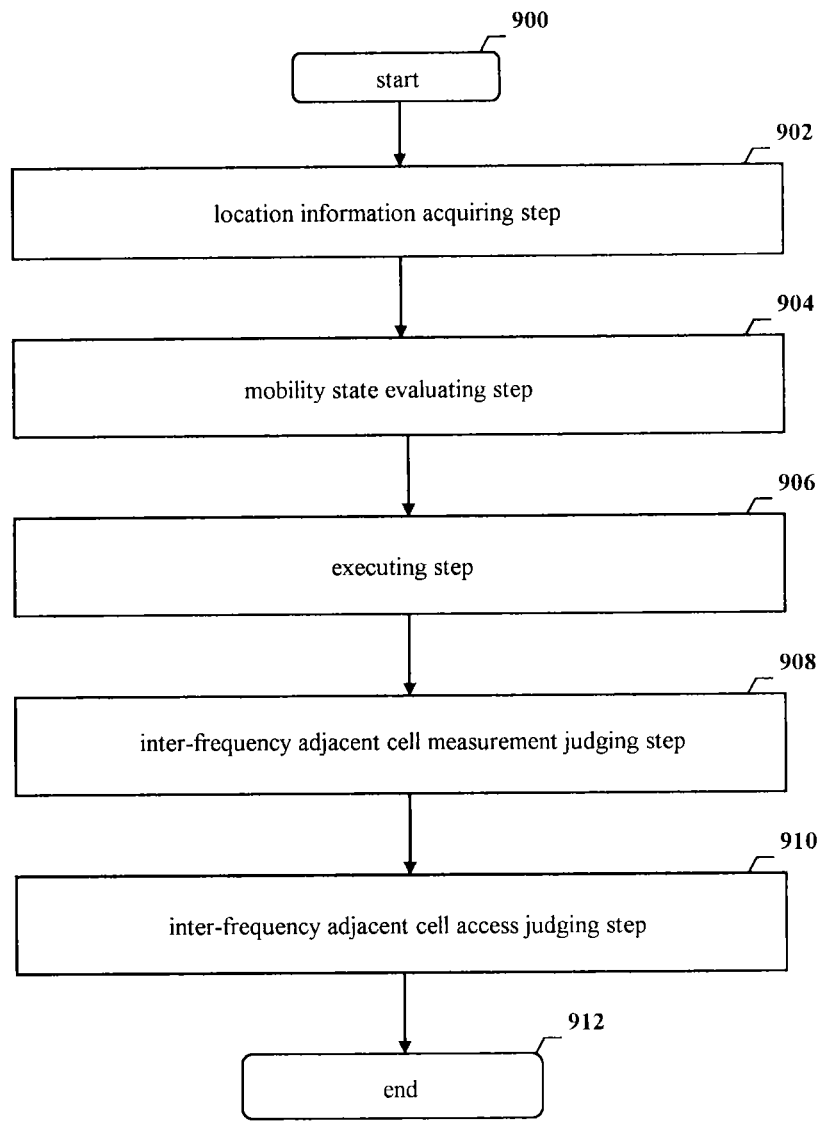
FIG. 9 is a flow chart illustrating a method for use in a wireless communication system according to another embodiment of the invention.

A method for use in a wireless communication system according to another embodiment of the invention will be described with reference to FIG. 9 below. FIG. 9 is a flow chart illustrating a method for use in a wireless communication system according to another embodiment of the invention.

As shown in FIG. 9, the method begins with step 900. After the step 900, the method proceeds to step 902.

The step 902 is a location information acquiring step. At the step 902, the location information of the user equipment is acquired.

After the step 902, the method proceeds to step 904.

The step 904 is a mobility state evaluating step. At the step 904, the mobility state of the user equipment is evaluated according to the location information of the user equipment at different time.

After the step 904, the method proceeds to step 906.

The step 906 is an executing step. At the step 906, corresponding operations related to the small cell detection are executed according to changes in the mobility state and the location information of the user equipment.

After the step 906, the method proceeds to step 908.

The step 908 is an inter-frequency adjacent cell measurement judging step. At the step 908, it may be judged whether to trigger the inter-frequency adjacent cell measurement of the user equipment in a case that the user equipment satisfies the initial condition of the small cell detection.

After the step 908, the method proceeds to step 910.

The step 910 is an inter-frequency adjacent cell access judging step. At the step 910, it may be judged, according to the measurement report of the user equipment and the location information of the user equipment, whether to trigger the inter-frequency cell handover and/or carrier loading of the user equipment, in a case that the inter-frequency adjacent cell measurement of the user equipment has been triggered.

The method as shown in FIG. 9 is a method corresponding to the device described in FIG. 6, and specific details thereof will not be repeated herein.

Hereinafter, specific embodiments carrying out the small cell detection procedure will be described according to a position at which the user equipment appears. The following embodiments are only exemplary but not limitation.

Embodiment 1

In this embodiment, the user equipment initially appears in the outer region, and moves towards the small cell at a low speed. The procedure of the small cell detection according to this embodiment will be described in detail below.

The user equipment initially appears in the outer region and is connected with the base station. At this time, the base station configures a default acquirement cycle for the user equipment, and acquires the location information of the user equipment at the default acquirement cycle, thereby updating the location information of the user equipment periodically.

After acquiring two or more pieces of location information of the user equipment, the base station may calculate the movement speed of the user equipment according to the acquired two or more pieces of location information, and determine the boundary range corresponding to the small cell according to the calculated movement speed.

After determining the boundary range corresponding to the small cell according to the calculated movement speed, the coverage range of the base station can be divided into the inner region, the middle region and the outer region according to the boundary range and the coverage range of the small cell. Further, the acquirement cycle of the user equipment can be further updated according to the current movement speed of the user equipment. For example, the faster the movement speed of the user equipment is, the shorter the acquirement cycle of the user equipment is; and the slower the movement speed of the user equipment is, the longer the acquirement cycle of the user equipment is. Further, it is to be noted that the initial default acquirement cycle is subject to the shorter acquirement cycle. For the case that the disposition of the small cells is dense, several small cells close to each other are classified as one cluster, the boundary range of each small cell within the cluster is determined respectively, and the union of the boundary ranges of each of the small cells within the cluster is calculated as the boundary range of this cluster, which is no longer a circle at this time.

The base station periodically updates the location information of the user equipment at the acquirement cycle, and calculates the movement speed of the user equipment according to the location information of the user equipment, until the user equipment leaves the coverage range of the base station or enters into other regions. If the movement speed of the user equipment changes, the corresponding boundary range of the small cell also changes correspondingly.

The user equipment moves within the coverage range of the base station, once the base station discovers that the user equipment is located within the boundary range corresponding to the small cell, corresponding judging procedure is performed to judge whether the user equipment satisfies the initial condition of the small cell detection, the initial condition being one or more of the following items: the user equipment is in non-high speed mobility state, the small cell is in a good load condition and has remaining resources for access of the user equipment.

If the user equipment satisfies the initial condition of the small cell detection, the base station may accordingly shorten the acquirement cycle of the user equipment. Further, the Global Navigation Satellite System assisted method can also be used to improve the accuracy of the measurement positioning for the user equipment. Further, if the coverage range of the small cell is very small, or if the difference between the accuracies of the measurement positioning obtained using the angle of arrival and the round trip time and the measurement result of the Global Navigation Satellite System is too large, the Global Navigation Satellite System can be used as the main positioning method.

If the user equipment continues to move towards the small cell, the base station acquires the location information of the user equipment at the corresponding acquirement cycle, and calculates the movement speed and the movement direction of the user equipment according to the measured multiple location information of the user equipment. Then, according to the above result, the reaction time $t_{reaction}$ that the user equipment arrives at the coverage range of the small cell from the current position with the current movement speed and movement direction is calculated, if the calculated reaction time $t_{reaction}$ is smaller than the predetermined reaction time threshold $T_{reaction}$, then the inter-frequency adjacent cell detection procedure of the user equipment is triggered at the triggering probability corresponding to the current position of the user equipment.

If the user equipment has triggered the inter-frequency adjacent cell detection procedure, the base station may trigger, according to the measurement report of the user equipment and the location information of the user equipment, the inter-frequency cell handover and/or carrier loading procedure of the user equipment at appropriate timing. If the user equipment has not triggered the inter-frequency adjacent cell detection procedure, the base station may continue to acquire the location information of the user equipment at the corresponding acquirement cycle, calculate the movement speed and the movement direction of the user equipment according to the measured multiple location information of the user equipment, calculate the reaction time $t_{reaction}$ and compare the calculated reaction time $t_{reaction}$ with the predetermined reaction time threshold $T_{reaction}$.

Then, the user equipment completes the inter-frequency cell handover and/or carrier loading, and the base station completes corresponding operations, thereby realizing location-based small cell detection procedure.

Embodiment 2

The embodiment 2 is substantially the same as the embodiment 1, and the main different lies in: in the embodiment 2, the movement speed of the user equipment changes continuously. Differences between the implementing manners of the embodiment 2 and the embodiment 1 are described in detail below.

When the user equipment initially appears in the outer region, the base station calculates the movement speed of the user equipment according to the obtained multiple location information of the user equipment, and updates the acquirement cycle of the user equipment according to the calculated movement speed.

When the base station discovers the user equipment is located within the boundary range corresponding to the small cell, the base station may calculate an average value of the multiple movement speeds of the user equipment within a past predetermined time period, and judge whether the user equipment satisfies the initial condition of the small cell detection according to the calculated average value of the multiple movement speeds. If the user equipment does not satisfy the initial condition of the small cell detection, then the small cell detection procedure is terminated, until the user equipment satisfies the initial condition of the small cell detection.

Other processing manners of the embodiment 2 are the same as those of the embodiment 1, and specific details thereof will be not repeated herein.

Embodiment 3

The embodiment 3 is substantially the same as the embodiment 1, and the main difference lies in: in the embodiment 3, the position at which the user equipment initially appears is within the boundary range corresponding to the small cell. Differences between the implementing manners of the embodiment 3 and the embodiment 1 will be described in detail below.

The boundary range corresponding to the small cell is set as a default value, which corresponds to the higher movement speed among the movement speeds of the user equipment.

The base station acquires the location information of the user equipment at the corresponding cycle, and calculates the movement speed and/or movement direction of the user equipment according to the obtained multiple location information of the user equipment.

When the base station discovers that the user equipment leaves the boundary range corresponding to the small cell and enters into the outer range, the base station correspondingly performs positioning on the user equipment at a low accuracy. Further, when the base station discovers the user equipment approaches the coverage range of the small cell, the inter-frequency adjacent cell measurement of the user equipment is triggered according to the above described method.

Other processing manners of the embodiment 3 are the same as those of the embodiment 1, and specific details thereof will not be repeated herein.

Figure 10:
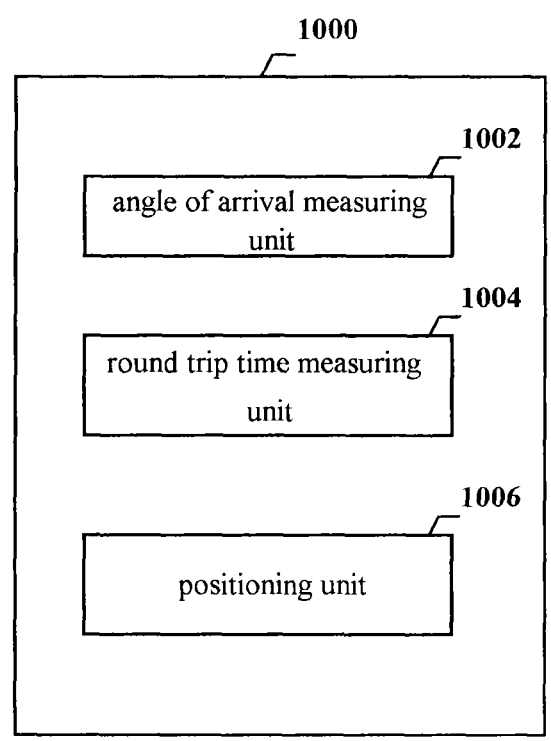
FIG. 10 is a block diagram illustrating configuration of a device in a wireless communication system according to another embodiment of the invention.

Configuration of a device in a wireless communication system according to an embodiment of the invention will be described with reference to FIG. 10 below. FIG. 10 is a block diagram illustrating configuration of a device in a wireless communication system according to an embodiment of the invention.

As shown in FIG. 10, the device 1000 in the wireless communication system may include an angle of arrival measuring unit 1002, a round trip time measuring unit 1004 and a positioning unit 1006.

The angle of arrival measuring unit 1002 may measure an angle of arrival of the signal sent to the base station from the user equipment; the round trip time measuring unit 1004 may measure the round trip time required for one round trip of the signal between the user equipment and the base station; and the positioning unit 1006 may position the user equipment according to the angle of arrival and the round trip time. Particularly, the round trip time measuring unit 1004 utilizes timing advance of the user equipment to perform measurement on the user equipment so as to obtain the round trip time.

According to another embodiment of the invention, the above device may further include a receiving unit and a correcting unit. The receiving unit may receive the positioning information of the Global Navigation Satellite System reported by the user equipment, and the correcting unit may calculate the error correction factor with the positioning information of the Global Navigation Satellite System as the reference value and correct the positioning using the error correction factor.

Figure 11:
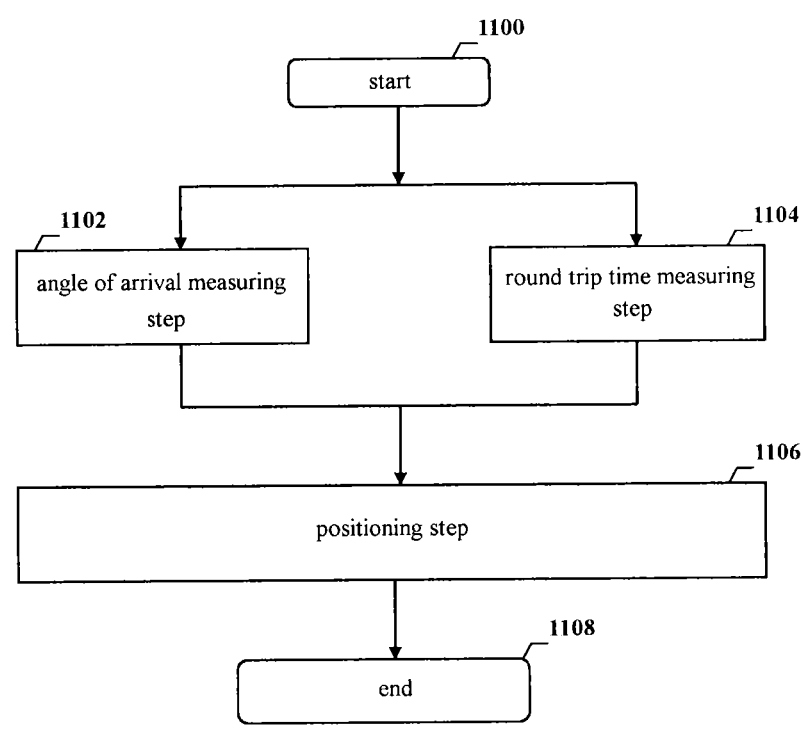
FIG. 11 is a flow chart illustrating a method for use in a wireless communication system according to another embodiment of the invention.

A method for use in a wireless communication system according to an embodiment of the invention will be described with reference to FIG. 11 below. FIG. 11 is a flow chart illustrating a method for use in a wireless communication system according to an embodiment of the invention.

As shown in FIG. 11, the method begins with step 1100. After the step 1100, the method proceeds to step 1102 or step 1104.

The step 1102 is an angle of arrival measuring step. At the step 1102, the angle of arrival of the signal sent to the base station from the user equipment is measured.

The step 1104 is a round trip time measuring step. At the step 1104, the round trip time required for one round trip of the signal between the user equipment and the base station is measured. In the round trip time measuring step, the timing advance of the user equipment is utilized to perform measurement on the user equipment so as to obtain the round trip time.

After the step 1102 or the step 1104, the method proceeds to step 1106.

The step 1106 is a positioning step. At the step 1106, the user equipment is positioned according to the angle of arrival and the round trip time.

Further, according to another embodiment of the invention, the above method may further include a receiving step and a correcting step. In the receiving step, the positioning information of the Global Navigation Satellite System reported by the user equipment is received, and in the correcting step, the error correction factor is calculated with the positioning information of the Global Navigation Satellite System as the reference value, and the positioning is corrected using the error correction factor.

The method as shown in FIG. 11 is a method corresponding to the device described in FIG. 10, and specific details thereof will not be repeated herein.

Further, the embodiment of the application further proposes a program product carrying machine-executable instructions, which when being executed on an information processing apparatus, cause the information processing apparatus to perform the above method for use in the wireless communication system according to the embodiments of the invention.

Further, the embodiment of the application further proposes a storage medium containing machine readable program codes, which when being executed on the information processing apparatus, cause the information processing apparatus to perform the above method for use in the wireless communication system according to the embodiments of the invention.

Accordingly, a storage medium on which the above program product storing machine readable instruction codes is carried is also included in the disclosure of the invention. The storage medium includes but not limited to a floppy disk, an optical disk, a magneto-optical disk, a storage card, a memory rod and the like.

The devices in the wireless communication system according to the embodiment of the invention and constituting components thereof can be configured in software, firmware, hardware or combinations thereof. Specific means or manners available for the configuration are well known to those skilled in the art, and no detailed description will be made herein. In the case of being embodied in software or firmware, a program constituting the software is installed from a storage medium or a network to an information processing apparatus with a dedicated hardware structure, e.g., the information processing apparatus 1200 illustrated in FIG. 12, which can perform various functions when various programs are installed thereon.

Figure 12:
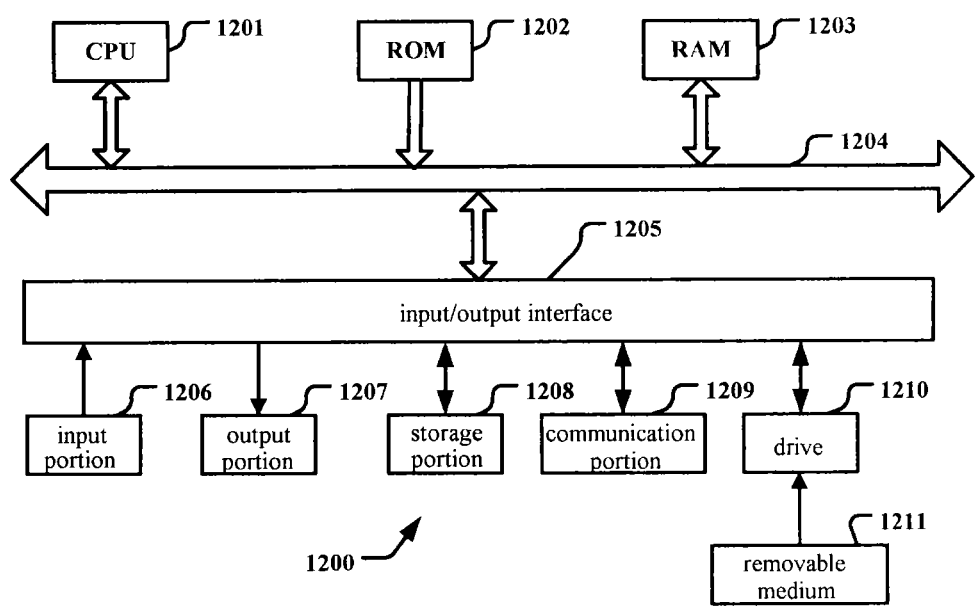
FIG. 12 is a schematic block diagram illustrating an information processing apparatus that may be used for implementing an embodiment of the invention.

FIG. 12 is a schematic block diagram illustrating an information processing apparatus that may be used for implementing an embodiment of the invention.

In FIG. 12, a Central Processing Unit (CPU) 1201 performs various processes according to a program stored in a Read Only Memory (ROM) 1202 or loaded from a storage portion 1208 into a Random Access Memory (RAM) 1203 in which data required when the CPU 1201 performs the various processes is also stored as needed. The CPU 1201, the ROM 1202 and the RAM 1203 are connected to each other via a bus 1204 to which an input/output interface 1205 is also connected.

The following components are connected to the input/output interface 1205: an input portion 1206 including a keyboard, a mouse, etc.; an output portion 1207 including a display, e.g., a Cathode Ray Tube (CRT), a Liquid Crystal Display (LCD), etc., a speaker, etc.; a storage portion 1208 including a hard disk, etc.; and a communication portion 1209 including a network interface card, e.g., an LAN card, a modem, etc. The communication portion 1209 performs a communication process over a network, e.g., the Internet. A drive 1210 is also connected to the input/output interface 1205 as needed. A removable medium 1211, e.g., a magnetic disk, an optical disk, an magneto optical disk, a semiconductor memory, etc., can be installed on the drive 1210 as needed so that a computer program fetched therefrom can be installed into the storage portion 1208 as needed.

In the case that the foregoing series of processes are performed in software, a program constituting the software is installed from a network, e.g., the Internet, etc., or a storage medium, e.g., the removable medium 1211, etc.

Those skilled in the art shall appreciate that such a storage medium will not be limited to the removable medium 1211 illustrated in FIG. 12 in which the program is stored and which is distributed separately from the apparatus to provide a user with the program. Examples of the removable medium 1211 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1202, a hard disk included in the storage portion 1208, etc., in which the program is stored and which is distributed together with the apparatus including the same to the user.

The instruction codes, when read and executed by the machine, may perform the above method for use in the wireless communication system according to the embodiments of the invention.

It is obvious for those ordinarily skilled in the art that many modifications and variations may be made without departing from the scope and spirit of the invention. Selections and explanations of the embodiments are desired to best explain the principle and actual applications of the invention, and enable those ordinarily skilled in the art to learn that the invention may have various implementation manners with various modifications suitable for desired specific use.

The invention claimed is:

1. A device in a wireless communication system, comprising:
    a processor configured to
        acquire a plurality of location information of user equipment at different time at an acquirement cycle;
        calculate, according to at least the location information, stay time required for the user equipment to pass through a small cell;
        determine a boundary range corresponding to the small cell according to a magnitude of the movement speed of the user equipment, the boundary range becoming larger as the magnitude of the movement speed becomes larger;
        determine whether the user equipment is located either outside or within the boundary range based on the acquired location information;
        set a longer acquirement cycle for the acquirement cycle in case the processor determines the user equipment is located outside the boundary range, and set a shorter acquirement cycle for the acquirement cycle in case the processor determines the user equipment is located within the boundary range;
        evaluate a mobility state of the user equipment according to the location information of the user equipment at different time by comparing the calculated stay time with a predetermined stay time threshold value;
        determine an operation from among a plurality of operations related to small cell detection according to changes in the mobility state and the location information of the user equipment; and
        execute the determined operation related to small cell detection.

2. The device according to claim 1, wherein the processor is configured to perform positioning on the user equipment according to round trip time and an angle of arrival which are obtained by performing measurement on the user equipment, so as to acquire the location information of the user equipment, wherein the round trip time is obtained by performing measurement on the user equipment using timing advance information of the user equipment by the processor.

3. The device according to claim 2, wherein the processor is configured to perform measurement on the user equipment for a plurality of times, at a predetermined sampling cycle, within a predetermined sampling time window, so as to obtain a plurality of the round trip times and a plurality of the angles of arrival.

4. The device according to claim 2, wherein the processor is further configured to calculate an error correction factor using a result of Global Navigation Satellite System assisted measurement as a reference value, and correct the positioning using the error correction factor.

5. The device according to claim 1, wherein the operations related to the small cell detection which are executed by the processor include one or more of the following operations: judging, according to a distance between the user equipment and a small cell, whether the user equipment is approaching the small cell, or judging whether the user equipment satisfies an initial condition of the small cell detection.

6. The device according to claim 1, wherein the processor is further configured to calculate a movement speed and/or a movement direction of the user equipment according to the plurality of location information of the user equipment at different time.

7. The device according to claim 6, wherein the processor is further configured to classify the movement speed of the user equipment into different speed levels, and the processor is further configured to classify, using predetermined criteria corresponding to the speed levels of the user equipment, the position where the user equipment is located into different regions.

8. The device according to claim 6, wherein the processor is further configured to:
judge, by comparing the distance between the user equipment and the small cell with the boundary range, whether the user equipment is approaching the small cell.

9. The device according to claim 8, wherein the processor is further configured to:
classify the small cells adjacent to each other into the same cluster; and
calculate a union of boundary ranges corresponding to the respective small cells in the same cluster as a boundary range corresponding to the same cluster.

10. The device according to claim 8, wherein the processor is configured to calculate, according to the location information, the movement speed and the movement direction of the user equipment, the stay time.

11. The device according to claim 6, wherein the processor is further configured to judge whether to trigger inter-frequency adjacent cell measurement of the user equipment.

12. The device according to claim 11, wherein, the processor is further configured to:
calculate, according to the location information, the movement speed and the movement direction of the user equipment, time for arrival of the user equipment at a coverage range of the small cell; and
compare the calculated time with a predetermined time threshold value to judge whether to trigger inter-frequency adjacent cell measurement of the user equipment.

13. The device according to claim 11, wherein, the processor is further configured to:
divide the boundary range into a plurality of sub-regions, each sub-region corresponding to a predetermined triggering probability;
judge, according to the location information of the user equipment, a sub-region where the user equipment is located and its corresponding triggering probability; and
trigger inter-frequency adjacent cell measurement of the user equipment according to the determined triggering probability corresponding to the sub-region where the user equipment is located.

14. The device according to claim 11, wherein the processor judges, according to a measurement report of the user equipment and the location information of the user equipment, whether to trigger inter-frequency cell handover and/or carrier loading of the user equipment, in the case that inter-frequency adjacent cell measurement of the user equipment has been triggered.

15. A method for use in a wireless communication system, comprising:
acquiring a plurality of location information of user equipment at different time at an acquirement cycle;
calculating, according to at least the location information, stay time required for the user equipment to pass through a small cell;
determining a boundary range corresponding to the small cell according to a magnitude of the movement speed of the user equipment, the boundary range becoming larger as the magnitude of the movement speed becomes larger;
determining whether the user equipment is located either outside or within the boundary range based on the acquired location information;
setting a longer acquirement cycle for the acquirement cycle in case the processor determines the user equipment is located outside the boundary range, and setting a shorter acquirement cycle for the acquirement cycle in case the processor determines the user equipment is located within the boundary range;
evaluating a mobility state of the user equipment according to the location information of the user equipment at different time by comparing the calculated stay time with a predetermined stay time threshold value;
determining, using a processor, an operation from among a plurality of operations related to small cell detection according to changes in the mobility state and the location information of the user equipment; and
executing the determined operation related to small cell detection.

16. A non-transitory computer readable medium including executable instructions, which when executed by a computer cause the computer to execute a method for use in a wireless communication system, the method comprising:
acquiring a plurality of location information of user equipment at different time at an acquirement cycle;
calculating, according to at least the location information, stay time required for the user equipment to pass through a small cell;
determining a boundary range corresponding to the small cell according to a magnitude of the movement speed of the user equipment, the boundary range becoming larger as the magnitude of the movement speed becomes larger;
determining whether the user equipment is located either outside or within the boundary range based on the acquired location information;

setting a longer acquirement cycle for the acquirement cycle in case the processor determines the user equipment is located outside the boundary range, and setting a shorter acquirement cycle for the acquirement cycle in case the processor determines the user equipment is located within the boundary range;

evaluating a mobility state of the user equipment according to the location information of the user equipment at different time by comparing the calculated stay time with a predetermined stay time threshold value;

determining an operation from among a plurality of operations related to small cell detection according to changes in the mobility state and the location information of the user equipment; and executing the determined operation related to small cell detection.

* * * * *